(12) United States Patent
Amanai

(10) Patent No.: US 8,125,561 B2
(45) Date of Patent: Feb. 28, 2012

(54) ZOOMING OPTICAL SYSTEM AND ELECTRONIC IMAGE PICKUP APPARATUS USING THE SAME

(75) Inventor: Takahiro Amanai, Hachioji (JP)

(73) Assignee: Olympus Corporation, Tokyo (JP)

(*) Notice: Subject to any disclaimer, the term of this patent is extended or adjusted under 35 U.S.C. 154(b) by 294 days.

(21) Appl. No.: 12/653,781

(22) Filed: Dec. 18, 2009

(65) Prior Publication Data

US 2010/0194928 A1 Aug. 5, 2010

(30) Foreign Application Priority Data

Dec. 24, 2008 (JP) ................... 2008-328390
Oct. 14, 2009 (JP) ................... 2009-237129

(51) Int. Cl.
*H04N 5/225* (2006.01)
(52) U.S. Cl. ........................ 348/360; 359/687
(58) Field of Classification Search .................. 348/360, 348/361, 335; 359/581, 687
See application file for complete search history.

(56) References Cited

U.S. PATENT DOCUMENTS

| 4,240,699 A * | 12/1980 | Sato et al. ............. 359/687 |
| 2011/0261469 A1* | 10/2011 | Arai ..................... 359/687 |
| 2011/0273776 A1* | 11/2011 | Obama et al. .......... 359/581 |

FOREIGN PATENT DOCUMENTS

| JP | 2005-195757 | 7/2005 |
| JP | 2008-129238 | 6/2008 |

* cited by examiner

*Primary Examiner* — Tuan Ho
(74) *Attorney, Agent, or Firm* — Kenyon & Kenyon LLP

(57) ABSTRACT

A zooming optical system having six lens groups includes in order from an object side, a first lens group having a positive refracting power, which is fixed at the time of zooming, a second lens group having a negative refracting power, which is movable at the time of zooming, a third lens group having a positive refracting power, which is fixed at the time of zooming, a fourth lens group having a positive refracting power, which is movable at the time of zooming, a fifth lens group having a negative refracting power, which is movable at the time of zooming, and a sixth lens group having a positive refracting power, which is fixed at the time of zooming, and the first lens group includes a reflecting optical element for folding an optical path, and the third lens group includes an aperture stop, and the fifth lens group includes a single lens, and the zooming optical system satisfies the following conditional expression $$0.5 \leq f1/\sqrt{(fw \cdot ft)} \leq 2.0$$

where,
f1 denotes a focal length of the first lens group,
fw denotes a focal length of the overall zooming optical system at a wide angle end, and
ft denotes a focal length of the overall zooming optical system at a telephoto end.

9 Claims, 21 Drawing Sheets

435.84 —·—·—
656.27 - - - -
587.56 ———

ZOOMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2008-328390 filed on Dec. 24, 2008, and 2009-237129 filed on Oct. 14, 2009; the entire contents of which are incorporated herein by reference.

BACKGROUND OF THE INVENTION

1. Field of the Invention

The present invention relates to a zooming optical system and an electronic image pickup apparatus using the same.

2. Description of the Related Art

A digital camera has reached a level of being used practically, regarding making large the number of pixels (high image quality), and small-sizing and slimming. From a function point of view and a market point of view, a digital camera has substituted a silver salt 35 mm film camera. Therefore, as a next trend of evolution, further increase in the number of pixels along with a high zooming ratio and widening of an angle with the same size and slimness has been sought strongly. As a zooming optical system in which, slimming of an optical system has been realized, an optical system in which, a reflecting optical element for folding an optical path (a zoom lens of a folding type) is used in a first lens group (first lens group from an object side), has hitherto been available. When such zooming optical system is used, it is possible to make a depth of a camera casing extremely slim.

In the zoom lens system of the folding type, the reflecting optical element is disposed in the first lens group, and a path of a light beam is folded by the reflecting optical element. Here, in a case of folding assuredly the path of a light beam having an angle of field of a certain extent, it is necessary to secure a reflecting surface of a width required for folding in the reflecting optical element. Therefore, in the first lens group, an air conversion thickness along an optical axis increases inevitably. Particularly, when the angle is widened, the increase in the air conversion thickness becomes remarkable.

Therefore, in such optical system, by disposing a negative refracting power immediately before a reflecting surface and a positive refracting power immediately after the reflecting surface a width of the reflecting surface is made small, and the air conversion thickness is also made thin to some extent. As an example of an optical system with a high zooming ratio having such structure, optical systems disclosed in Japanese Patent Application Laid-open Publication No. 2005-195757 and 2008-129238 are available.

SUMMARY OF THE INVENTION

A zooming optical system having six lens groups according to a first aspect of the present invention includes in order from an object side, a first lens group having a positive refracting power, which is fixed at the time of zooming, a second lens group having a negative refracting power, which is movable at the time of zooming, a third lens group having a positive refracting power, which is fixed at the time of zooming, a fourth lens group having a positive refracting power, which is movable at the time of zooming, a fifth lens group having a negative refracting power, which is movable at the time of zooming, and a sixth lens group having a positive refracting power, which is fixed at the time of zooming, and the first lens group includes a reflecting optical element for folding an optical path, and the third lens group includes an aperture stop, and the fifth lens group includes a single lens, and the zooming optical system satisfies the following conditional expression $$0.5 \leq f1/\sqrt{(fw \cdot ft)} \leq 2.0$$

where, f1 denotes a focal length of the first lens group, fw denotes a focal length of the overall zooming optical system at a wide angle end, and ft denotes a focal length of the overall zooming optical system at a telephoto end.

An electronic image pickup apparatus according to a second aspect of the present invention includes the abovementioned zooming optical system, and an electronic image pickup element which is disposed on an image side of the zooming optical system, and it is possible to process image data which has been obtained by picking up an image formed through the zooming optical system, by the electronic image pickup element, and to output as image data having a shape changed, and the electronic image pickup apparatus satisfies the following conditional expression, when the zooming optical system has focused to any object for which, image forming magnification of the overall zooming optical system at the telephoto end becomes not more than 0.01

$$0.70 \leq y08/(fw \cdot \tan \omega 08w) \leq 0.98$$

where, y08 is expressed as $y08=0.8 \cdot y10$ when, in an effective image pickup surface (within a surface in which image can be picked up) of the electronic image pickup element, a distance (the maximum image height) from a center up to the farthest point is let to be y10, $\omega 08w$ denotes an angle with respect to an optical axis in an object point direction corresponding to an image point connecting to a position of y08 from a center on the image pickup surface at the wide angle end, and fw denotes the focal length at the wide angle end of the overall zooming optical system.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A shows a state at a wide angle end, FIG. 3B shows an intermediate state, and FIG. 3C shows a state at a telephoto end;

FIG. 4A shows a state at the wide angle end, FIG. 4B shows an intermediate state, and FIG. 4C shows a state at the telephoto end;

FIG. 5A shows a state at a wide angle end, FIG. 5B shows an intermediate state, and FIG. 5C shows a state at a telephoto end;

FIG. 6A shows a state at the wide angle end, FIG. 6B shows an intermediate state, and FIG. 6C shows a state at the telephoto end;

FIG. 7A shows a state at a wide angle end, FIG. 7B shows an intermediate state, and FIG. 7C shows a state at a telephoto end;

FIG. 8A shows a state at the wide angle end, FIG. 8B shows an intermediate state, and FIG. 8C shows a state at the telephoto end;

FIG. 15A is a front view of a mobile telephone 400, FIG. 15B is a side view of the mobile telephone 400, and FIG. 15C is a cross-sectional view of a photographic optical system 405;

FIG. 16A shows a state at a wide angle end, FIG. 16B shows an intermediate state, and FIG. 16C shows a state at a telephoto end;

FIG. 17A shows a state at the wide angle end, FIG. 17B shows an intermediate state, and FIG. 17C shows a state at the telephoto end;

FIG. 18A shows a state at a wide angle end, FIG. 18B shows an intermediate state, and FIG. 18C shows a state at a telephoto end;

FIG. 19A shows a state at the wide angle end, FIG. 19B shows an intermediate state, and FIG. 19C shows a state at the telephoto end;

FIG. 20A shows a state at a wide angle end, FIG. 20B shows an intermediate state, and FIG. 20C shows a state at a telephoto end; FIG. 21A shows a state at the wide angle end, FIG. 21B shows an intermediate state, and FIG. 21C shows a state at the telephoto end.

DETAILED DESCRIPTION OF THE PREFERRED EMBODIMENTS

Figure 1A:
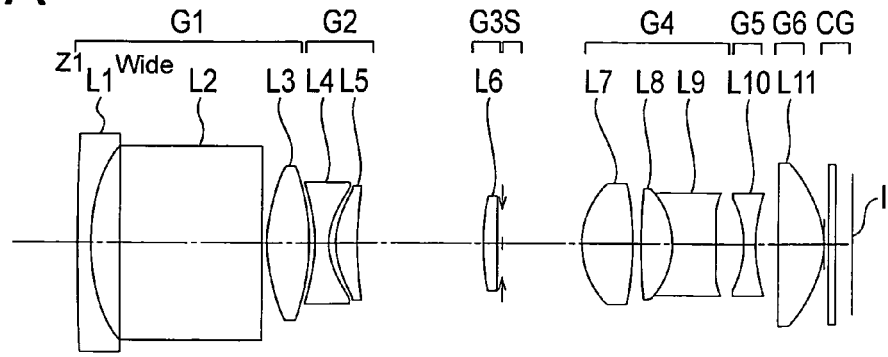
FIG. 1A, FIG. 1B, and FIG. 1C are cross-sectional views along an optical axis showing an optical arrangement at the time of infinite object point focusing of a zoom lens according to a first embodiment of the present invention, where.

Embodiments of a zooming optical system according to the present invention will be described below in detail while referring to the accompanying diagrams. However, the present invention is not restricted by the embodiments described below. To start with, before describing the embodiments, an action and an effect of the image forming optical system of the embodiments will be described below.

The zooming optical system of the embodiments is a zooming optical system having six lens groups, including, a first lens group having a positive refracting power, which is fixed at the time of zooming, a second lens group having a negative refracting power, which is movable at the time of zooming, a third lens group having a positive refracting power, which is fixed at the time of zooming, a fourth lens group having a positive refracting power which is movable at the time of zooming, a fifth lens group having a negative refracting power, which is movable at the time of zooming, and a sixth lens group having a positive refracting power which is fixed at the time of zooming. Here, the first lens group includes a reflecting optical element for folding an optical path, the third lens group includes an aperture stop, and the fifth lens group includes a single lens.

Moreover, the zooming optical system of the embodiments satisfies the following conditional expression (1).

$$0.5 \leq f1/\sqrt{(fw \cdot ft)} \leq 2.0 \quad (1)$$

where, f1 denotes a focal length of the first lens group, fw denotes a focal length of the overall zooming optical system at a wide angle end, and ft denotes a focal length of the overall zooming optical system at a telephoto end.

When the reflecting optical element for folding the optical path is inserted into the first lens group, the total length of the optical system becomes long. Particularly, when magnification is made higher, an angle is widened, and a diameter is increased, an increase in the total length is remarkable. Conditional expression for avoiding the remarkable increase in the total length is conditional expression (1).

When an upper limit in conditional expression (1) is surpassed, power of the first lens group becomes excessively small with respect to a zoom factor. Therefore, a prism becomes a large-size, and as a result, the total length of the lens system becomes long. On the other hand, when a lower limit in conditional expression (1) is surpassed, the power of the first lens group becomes excessively substantial with respect to the zoom factor. In this case, a chromatic aberration of magnification at a wide angle end and a longitudinal chromatic aberration at a telephoto end occur remarkably.

It is preferable that the zooming optical system satisfies the following conditional expression (1') instead of conditional expression (1).

$$0.7 \leq f1/\sqrt{(fw \cdot ft)} \leq 1.5 \quad (1')$$

Furthermore, it is more preferable that the zooming optical system satisfies the following conditional expression (1") instead of conditional expression (1)

$$0.9 \leq f1/\sqrt{(fw \cdot ft)} \leq 1.1 \quad (1'')$$

Moreover, in the zooming optical system of the embodiments, it is preferable that focusing is carried out by the fifth lens group, and the zooming optical system satisfies the following conditional expression (2)

$$0.4 \leq |\Delta 5g/fw| \leq 1.5 \quad (2)$$

where, $\Delta 5g$ denotes an amount of movement of the fifth lens group from the wide angle end to the telephoto end, and fw denotes the focal length of the overall zooming optical system at the wide angle end.

By moving the fifth lens group at the time of zooming, it is possible to make small a change in a height of light rays of the fifth lens group. Accordingly, it is possible to suppress a fluctuation of a curvature of field at the time of zooming.

When an upper limit in conditional expression (2) is surpassed, an amount of movement of the fifth lens group becomes excessively substantial. In this case, the total length of the optical system becomes substantial for securing a space for movement. On the other hand, when a lower limit in conditional expression (2) is surpassed, at the time of zooming, the change in the height of light rays incident on the fifth lens group becomes excessively substantial. In this case, the fluctuation of the curvature of field at the time of zooming becomes substantial, thereby lowering an optical performance remarkably.

It is preferable that the zooming optical system satisfies the following conditional expression (2') instead of conditional expression (2).

$$0.5 \leq |\Delta 5g/fw| \leq 1.0 \quad (2')$$

Furthermore, it is more preferable that the zooming optical system satisfies the following conditional expression (2") instead of conditional expression (2).

$$0.6 \leq |\Delta 5g/fw| \leq 0.8 \quad (2'')$$

Moreover, in the zooming optical system of the embodiments, it is preferable that focusing is carried out by the fifth lens group, and the zooming optical system satisfies the following conditional expression (3).

$$1.1 < \beta 5gt < 5.0 \quad (3)$$

where, $\beta 5gt$ denotes an image forming magnification of the fifth lens group when focused to any object point for which, image forming magnification of the overall zooming optical system at the telephoto end becomes not more than 0.01.

For making short the total length of the optical system, it is important to achieve a sufficient focusing sensitivity. For achieving sufficient focusing sensitivity, it is important that the zooming optical system satisfies the above-mentioned conditional expression (3).

When an upper limit in conditional expression (3) is surpassed, the focusing sensitivity becomes excessively substantial. In this case, since the power of the fifth lens group becomes excessively substantial, occurrence of the curvature of field becomes remarkable. On the other hand, when a lower limit in conditional expression (3) is surpassed, the focusing sensitivity becomes excessively small. In this case, since the amount of movement of the fifth lens group becomes substantial, the total length of the optical system becomes substantial.

It is preferable that the zooming optical system satisfies the following conditional expression (3') instead of conditional expression (3).

$$1.6 < \beta 5gt < 4.0 \quad (3')$$

Furthermore, it is more preferable that the zooming optical system satisfies the following conditional expression (3") instead of conditional expression (3).

$$2.0 < \beta 5gt < 3.5 \quad (3'')$$

Moreover, it is preferable that the zooming optical system of the embodiments satisfies the following conditional expression (4).

$$0.20 \leq \Delta 2g/\Delta 4g \cdot fw/ft \leq 0.90 \quad (4)$$

where, $\Delta 2g$ denotes an amount of movement of the second lens group from the wide angle end to the telephoto end, $\Delta 4g$ denotes an amount of movement of the fourth lens group from the wide angle end to the telephoto end, fw denotes the focal length at the wide angle end of the overall zooming optical system, and ft denotes the focal length at the telephoto end of the overall zooming optical system.

The third lens group includes the aperture stop. Moreover, the second lens group and the fourth lens group are positioned sandwiching the third lens group. By balancing an amount of movement of the second lens group and an amount of movement of the fourth lens group, it is possible to suppress an occurrence of the chromatic aberration of magnification.

Moreover, the amount of movement of the second lens group has an effect on a size of the first lens group, and the amount of movement of the fourth lens group has an effect on an amount of fluctuation of Fno at the time of zooming. Therefore, for balancing the performance and the size, a ratio of the amount of movement of the second lens group and the amount of movement of the fourth lens group is important.

When an upper limit in conditional expression (4) is surpassed, the amount of movement of the second lens group becomes excessively substantial. In this case, since a lens diameter and a total length of the first lens group become substantial, the total length of the optical system becomes long. On the other hand, when a lower limit in conditional expression (4) is surpassed, the amount of movement of the fourth lens group becomes substantial. In this case, the fluctuation of Fno of the optical system becomes excessively substantial. For improving this, it is necessary to make Fno at the wide angle end bright, and it is a factor which causes degradation of performance due to occurrence of a spherical aberration and a chromatic aberration.

It is preferable that the zooming optical system satisfies the following conditional expression (4') instead of conditional expression (4).

$$0.25 \leq \Delta 2g/\Delta 4g \cdot fw/ft \leq 0.60 \quad (4')$$

Furthermore, it is more preferable that the zooming optical system satisfies the following conditional expression (4") instead of conditional expression (4').

$$0.30 \leq \Delta 2g/\Delta 4g \cdot fw/ft \leq 0.50 \quad (4'')$$

Moreover, in the zooming optical system of the embodiments, it is preferable that the third lens group includes only one positive lens, and the zooming optical system satisfies the following conditional expression (5).

$$2.0 \leq fg3/fw \leq 8.0 \quad (5)$$

where, fg3 denotes a focal length of the third lens group, and fw denotes the focal length of at the wide angle end of the overall zooming optical system.

By forming the third lens group by one lens, it is possible to realize shortening of the total length of the zooming optical system. Moreover, by the zooming optical system satisfying conditional expression (5), it is possible to inhibit a height of light rays which are incident on the fourth lens, and to suppress an amount of occurrence of the coma aberration.

When an upper limit in conditional expression (5) is surpassed, since the height of light rays incident on the fourth lens group becomes high, the coma aberration occurs. On the other hand, when a lower limit in conditional expression (5) is surpassed, power of the third lens group becomes excessively substantial. In this case, since a relative decentering of the third lens group and the fourth lens group becomes substantial, degradation of the optical performance occurs remarkably.

It is preferable that the zooming optical system satisfies the following condition expression (5') instead of conditional expression (5).

$$2.5 \leq fg3/fw \leq 6.0 \quad (5')$$

Furthermore, it is more preferable that the zooming optical system satisfies the following conditional expression (5") instead of conditional expression (5).

$$3.4 \leq fg3/fw \leq 5.0 \quad (5'')$$

Moreover, in the zooming optical system of the embodiments, it is preferable that the second lens group includes in order from the object side, only two lenses namely a negative lens and a positive lens.

For making small a size of the zooming optical system, it is important to make substantial a power and to make small an amount of movement of the lens groups which are movable. However, when the power of the lens group becomes excessively substantial, an amount of occurrence of an aberration increases. Moreover, degradation of optical performance due to decentering of each lens and lens group becomes remarkable. Therefore, the power cannot be made substantial abruptly. Consequently, for facilitating shortening of the total length of the lens while securing the space for movement at the time of zooming without making the power substantial abruptly, it is important that the second lens group is formed by only two lenses.

Moreover, in the zooming optical system of the embodiments, it is preferable that a lens nearest to the object side in the second lens group is a negative lens, and the zooming optical system satisfies the following conditional expression (6).

$$1.0 \leq (R21-R22)/(R21+R22) \leq 4.3 \quad (6)$$

where,

R21 denotes a radius of curvature of a surface on the object side of the negative lens, and R22 denotes a radius of curvature of a surface on the image side of the negative lens.

By the movement of the lens at the time of zooming, passing of light rays of an angle of field at periphery (lens peripheral portion) changes remarkably. Accordingly, a fluctuation in the chromatic aberration of magnification occurs. Consequently, by letting the lens nearest to the object side in the second lens group to be a negative lens and by the zooming optical system satisfying conditional expression (6), it is possible to balance the chromatic aberration of magnification at the wide angle end and an axial chromatic aberration at the wide angle end.

When an upper limit in conditional expression (6) is surpassed, the radius of curvature of the surface on the image side of the negative lens becomes excessively substantial with respect to the radius of curvature of the surface on the object side of the negative lens. In this case, the occurrence of the chromatic aberration of magnification at the wide angle end becomes excessively substantial. On the other hand, when a lower limit in conditional expression (6) is surpassed, the radius of curvature of the surface on the image side of the negative lens becomes excessively small with respect to the radius of curvature of the surface on the object side of the negative lens. In this case, the occurrence of the chromatic aberration of magnification at the telephoto end becomes excessively substantial.

It is preferable that the zooming optical system satisfies the following conditional expression (6') instead of conditional expression (6).

$$1.3 \leq (R21-R22)/(R21+R22) \leq 2.8 \quad (6')$$

Furthermore, it is more preferable that the zooming optical system satisfies the following conditional expression (6") instead of conditional expression (6).

$$1.7 \leq (R21-R22)/(R21+R22) \leq 2.4 \quad (6'')$$

Moreover, in the zooming optical system of the embodiments, it is preferable that the first lens group includes in order from the object side, a lens having a negative refracting power, a reflecting member, and a lens having a positive refracting power, and the zoom optical system satisfies the following conditional expression (7).

$$20 \leq vd2-vd1 \leq 60 \quad (7)$$

where, vd1 denotes Abbe's number of the lens having a negative refracting power, and vd2 denotes Abbe's number of the lens having a positive refracting power.

When the first lens group is let to include in order from the object side, the lens having a negative refracting power, the reflecting member, and the lens having a positive refracting power, passing of light rays of an angle of field at periphery (lens peripheral portion) changes remarkably. In this case, there is a fluctuation in the chromatic aberration of magnification. Therefore, by satisfying conditional expression (7), it is possible to balance the chromatic aberration of magnification at the wide angle end and at the telephoto end.

When an upper limit in conditional expression (7) is surpassed, a dispersion of a concave lens becomes excessively strong. In this case, as light rays are refracted strongly at a periphery of the concave lens at the wide angle end, the occurrence of the chromatic aberration of magnification at the wide angle end becomes remarkable. On the other hand, when a lower limit in conditional expression (7) is surpassed, the occurrence of the chromatic aberration of magnification at the telephoto end becomes remarkable.

It is preferable that the zooming optical system satisfies the following conditional expression (7') instead of conditional expression (7).

$$34 \leq \nu d2 - \nu d1 \leq 55 \quad (7')$$

Furthermore, it is more preferable that the zooming optical system satisfies the following conditional expression (7") instead of conditional expression (7).

$$38 \leq \nu d2 - \nu d1 \leq 48 \quad (7'')$$

Moreover, in the zooming optical system of the embodiments, it is preferable that the second lens group includes at least one lens which is made of an organic material.

Moreover, in the zooming optical system of the embodiments, it is preferable that the fourth lens group includes at least one lens which is made of an organic material.

Moreover, in the zooming optical system of the embodiments, it is preferable that in the fourth lens group, a refracting surface nearest to the object side and a refracting surface nearest to the image side are aspheric surfaces, and the refracting surface nearest to the object side has a shape having a gentle curve from an optical axis toward the periphery, and the refracting surface nearest to the image side has a shape having a sharp curve from the optical axis toward the periphery.

The fourth lens group being a lens group having an extremely strong power, the degradation of performance due to decentering of the lenses in the fourth lens group is susceptible to occur. Consequently, it is preferable that the refracting surface nearest to the object side and the refracting surface nearest to the image side are aspheric surfaces. At this time, it is preferable that the shape of the refracting surface nearest to the object side is a shape having a gentle curve from the optical axis toward the periphery. Moreover, it is preferable that the shape of the refracting surface nearest to the image side is a shape having a sharp curve from the optical axis toward the periphery. By letting each surface to have such shape, it is possible to reduce the degradation of performance due to the decentering of the lenses in the fourth lens group.

Moreover, an electronic image pickup apparatus of the embodiment includes one of the abovementioned zooming optical systems, and an electronic image pickup element which is disposed on an image side of the zooming optical system, and it is possible to process image data which has been obtained by picking up an image formed through the zooming optical system, by the electronic image pickup element, and to output as image data having a shape changed, and the electronic image pickup apparatus satisfies the following conditional expression (8), when the zooming optical system has focused to an object point for which, an image forming magnification of the overall zooming optical system at the telephoto end becomes not more than 0.01.

$$0.70 \leq y08/(fw \cdot \tan \omega 08w) \leq 0.98 \quad (8)$$

where, y08 is expressed as y08=0.8·y10 when, in an effective image pickup surface (within a surface in which image can be picked up) of the electronic image pickup element, a distance (the maximum image height) from a center up to the farthest point is let to be y10, ω08w denotes an angle with respect to an optical axis in an object point direction corresponding to an image point connecting to a position of y08 from a center on the image pickup surface at the wide angle end, and fw denotes the focal length at the wide angle end of the overall zooming optical system.

An arrangement is to be made such that, near the wide angle end of the zooming optical system, the electronic image pickup element is made to form an image in a state of having a substantial barrel distortion intentionally. By making such an arrangement, it is possible to make small an effective diameter of the first lens group in which the lens diameter is susceptible to be the most substantial. As a result, it is possible to make the first lens group thin.

Moreover, when the first lens group includes only two components namely a negative lens component and a positive lens component, for correcting the distortion, a distance between the two lens components has to be not less than a certain fixed value. Incidentally, by allowing an amount of distortion, since this distance is not required to be much, the slimming of the optical system can be realized even at this point. Moreover, it is advantageous also for a correction of astigmatism.

On the other hand, an image distorted to be barrel shaped is subjected to optical/electrical conversion in the image pickup element, and is obtained as image data. Therefore, this image data can be subjected to a process equivalent to a shape change electrically by a signal processing system. Therefore, when the image data output by the electronic image pickup apparatus is reproduced finally by a display device of some sort, an image almost resembling to a shape of an object to be photographed in which the distortion is corrected is obtained.

The abovementioned conditional expression (8) is an expression in which, a degree of the barrel distortion at the wide angle end of zooming is regulated. When conditional expression (8) is satisfied, it is possible to fetch information of a wide angle of field without letting the optical system become thick. The image distorted to the barrel shape upon being subjected to the optical/electrical conversion by the image pickup element, becomes image data distorted to barrel shape.

Here, when an upper limit in conditional expression (8) is surpassed, and particularly, takes a value close to 1, an image in which, the distortion has been corrected favorably optically is achieved. Therefore, a small correction carried out by an image processing section serves the purpose. However, it becomes difficult to make a wide angle of field while maintaining a small size of the optical system. On the other hand, when a lower limit in conditional expression (8) is surpassed, when the image distortion due to the distortion of the optical system is corrected by the image processing section, a drawing rate in a direction of irradiation in a peripheral portion of the angle of field becomes excessively high. As a result, in the image which is achieved by picking up, a degradation of sharpness of a peripheral portion of the image becomes conspicuous.

In this manner, by satisfying conditional expression (8), the small sizing and widening of the angle become possible.

It is preferable that the zooming optical system satisfies the following conditional expression (8') instead of conditional expression (8).

$$0.80 \leq y08/(fw \cdot \tan \omega 08w) \leq 0.98 \quad (8')$$

Furthermore, it is more preferable that the zooming optical system satisfies the following conditional expression (8") instead of conditional expression (8).

$$0.90 \leq y08/(fw \cdot \tan \omega 08w) \leq 0.98 \quad (8")$$

Embodiments

Figure 1B:
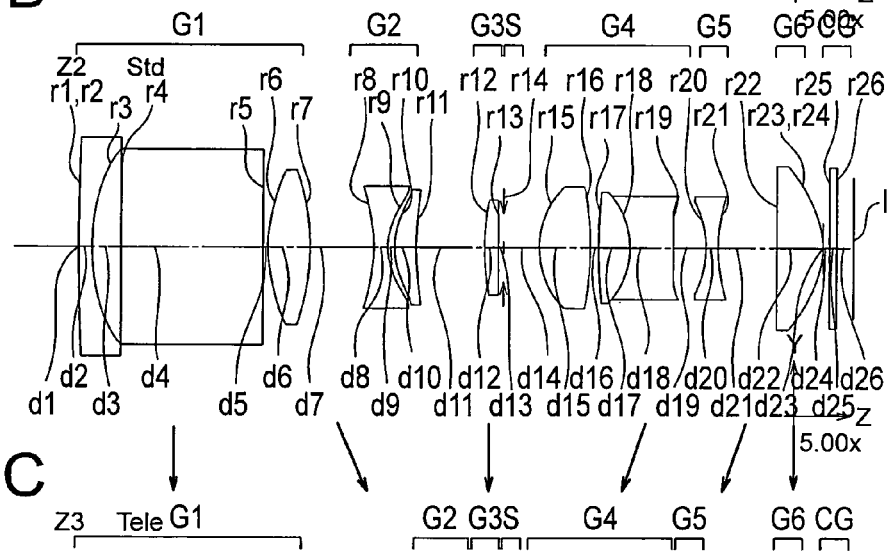
Figure 1C:
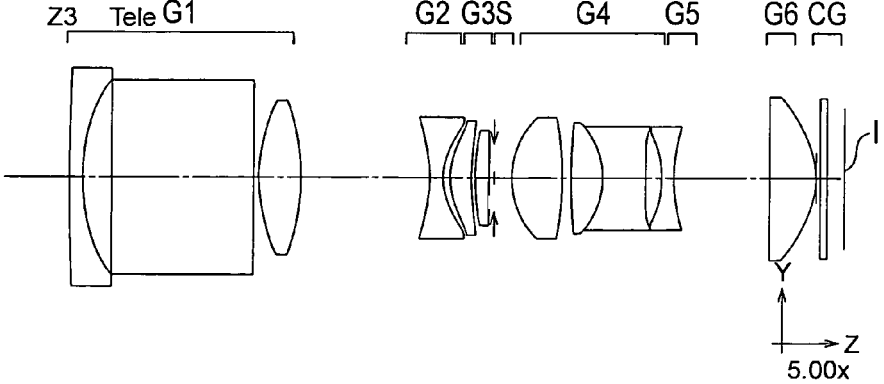
Figure 10:
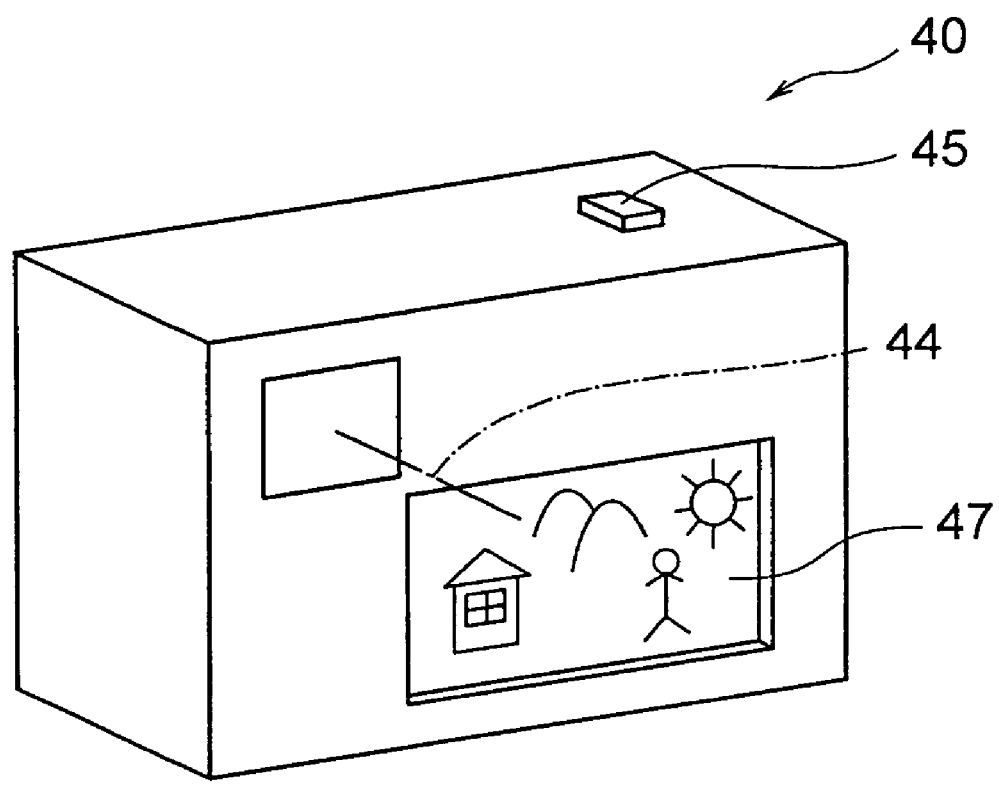
FIG. 10 is a rear perspective view of the digital camera 40.

Next, a zoom lens according to a first embodiment of the present invention will be described below. FIG. 1A, FIG. 1B, and FIG. 1C are cross-sectional views along an optical axis showing an optical arrangement at the time of infinite object point focusing of the zoom lens according to the first embodiment of the present invention, where, FIG. 1A shows a state at a wide angle end, FIG. 1B shows an intermediate focal length state, and FIG. 10 shows a state at a telephoto end.

Figure 2A:
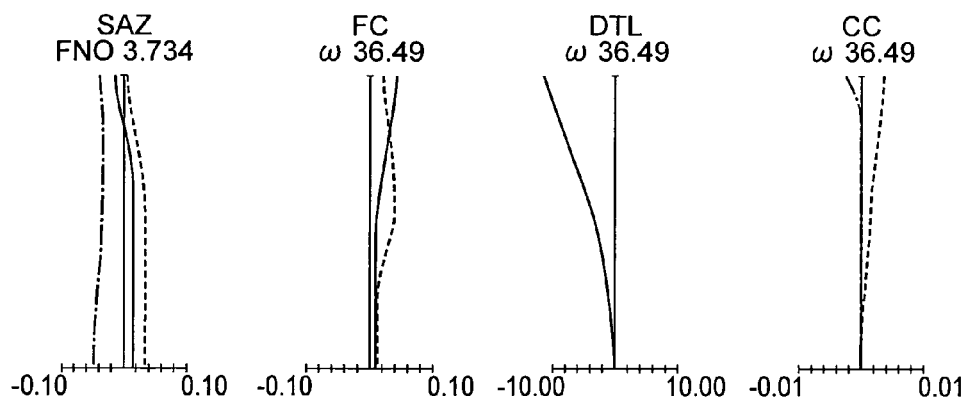
FIG. 2A, FIG. 2B, and FIG. 2C are diagrams showing a spherical aberration, an astigmatism, a distortion, and a chromatic aberration of magnification at the time of infinite object point focusing of the zoom lens according to the first embodiment, where.
Figure 2B:
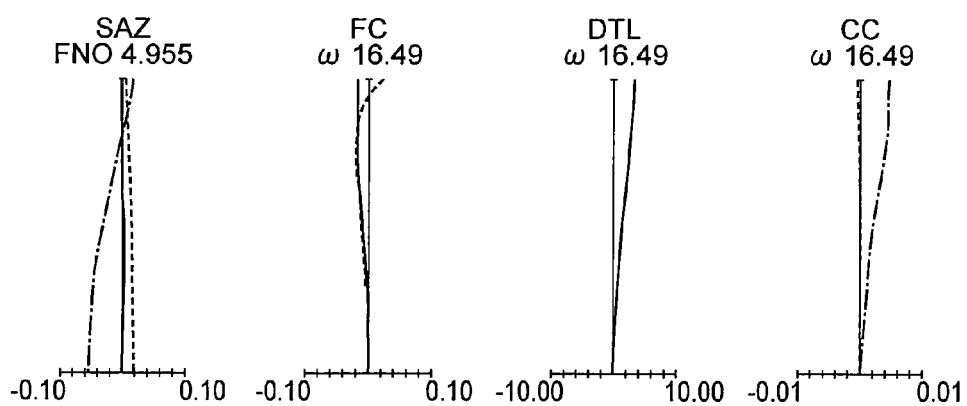
Figure 2C:
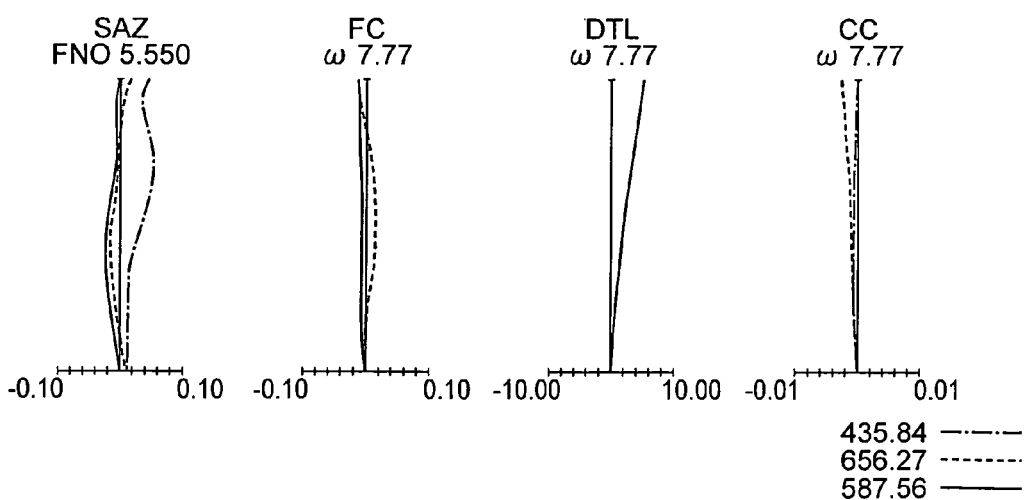

FIG. 2A, FIG. 2B, and FIG. 2C are diagrams showing a spherical aberration (SAZ), an astigmatism (FC), a distortion (DTL), and a chromatic aberration of magnification (CC) at the time of infinite object point focusing of the zoom lens according to the first embodiment, where, FIG. 2A shows a state at the wide angle end, FIG. 2B shows an intermediate focal length state, and FIG. 2C shows a state at the telephoto end. Moreover, ω denotes a half angle of field. Symbols in the aberration diagrams are same even in the embodiments to be described later. Moreover, in the aberration diagrams, a unit of distortion on a horizontal axis is %, and unit of other aberrations on the horizontal axis is mm.

The zoom lens of the first embodiment, as shown in FIG. 1A, FIG. 1B, and FIG. 1C, includes in order from the object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a negative refracting power, and a sixth lens group G6 having a positive refracting power. In all the following embodiments, in the cross-sectional views, CG denotes a cover glass, and I denotes an image pickup surface of the electronic image pickup element.

The first lens group G1 includes in order from the object side, a negative meniscus lens L1 having a convex surface directed toward the object side, a prism L2, and a biconvex positive lens L3, and has a positive refracting power as a whole.

The second lens group G2 includes in order from the object side, a biconcave negative lens L4 and a positive meniscus lens L5 having a convex surface directed toward the object side, and has a negative refracting power as a whole.

The third lens group G3 includes a planoconvex positive lens L6 having a convex surface directed toward the object side, and has a positive refracting power as a whole.

The fourth lens group G4 includes a biconvex positive lens L7, and a cemented lens of a biconvex positive lens L8 and a negative meniscus lens L9 having a convex surface directed toward the image side, and has a positive refracting power as a whole.

The fifth lens group G5 includes a biconcave negative lens L10, and has a negative refracting power as a whole.

The sixth lens group G6 includes a biconvex positive lens L11, and has a positive refracting power as a whole.

At the time of zooming from the wide angle end to the telephoto end, the first lens group G1 is fixed. The second lens group G2 moves toward the image side. The third lens group G3 is fixed. The aperture stop S is also fixed. The fourth lens group G4 moves toward the object side. The fifth lens group G5 moves toward the object side. The sixth lens group G6 is fixed.

An aspheric surface is provided to a total of 12 surfaces namely, a surface on the image side of the negative meniscus lens L1 and both surfaces of the biconvex positive lens L2 in the first lens group G1, both surfaces of the biconcave negative lens L4 and both surfaces of the positive meniscus lens L5 in the second lens group G2, a surface on the object side of the planoconvex positive lens L6 in the third lens group G3, both surfaces of the biconvex positive lens L7 and a surface on the object side of the negative meniscus lens L9 in the fourth lens group G4, and a surface on the object side of the biconvex positive lens L11 in the sixth lens group G6.

Figure 3A:
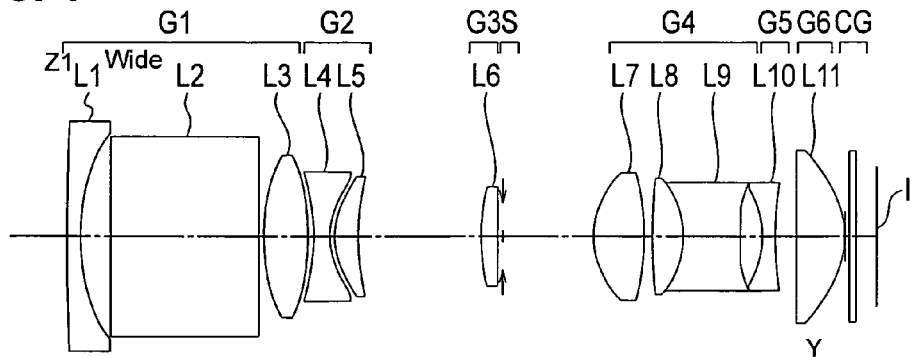
FIG. 3A, FIG. 3B, and FIG. 3C are cross-sectional views along an optical axis showing an optical arrangement at the time of infinite object point focusing of a zoom lens according to a second embodiment of the present invention, where.
Figure 3B:
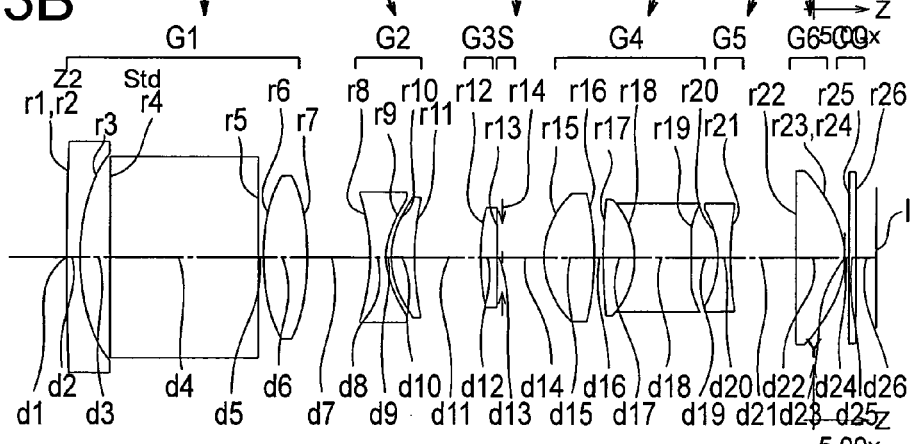
Figure 3C:
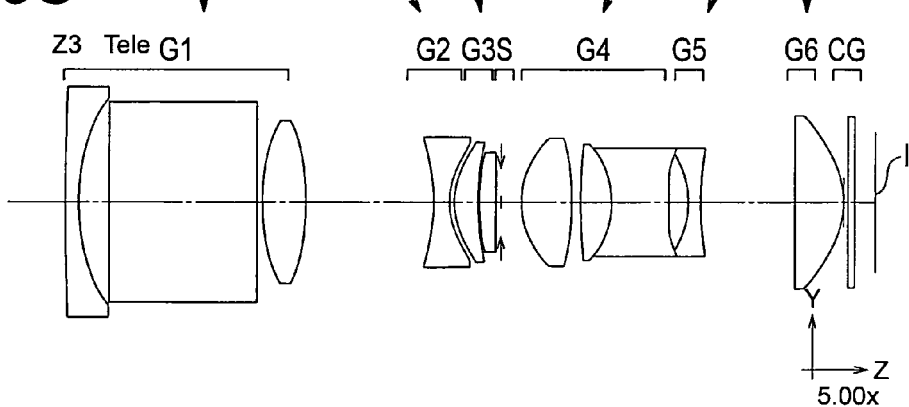

Next a zoom lens according to a second embodiment of the present invention will be described below. FIG. 3A, FIG. 3B, and FIG. 3C are cross-sectional views along an optical axis showing an optical arrangement at the time of infinite object point focusing of the zoom lens according to the second embodiment, where, FIG. 3A shows a state at a wide angle end, FIG. 3B shows an intermediate focal length state, and FIG. 3C shows a state at a telephoto end.

Figure 4A:
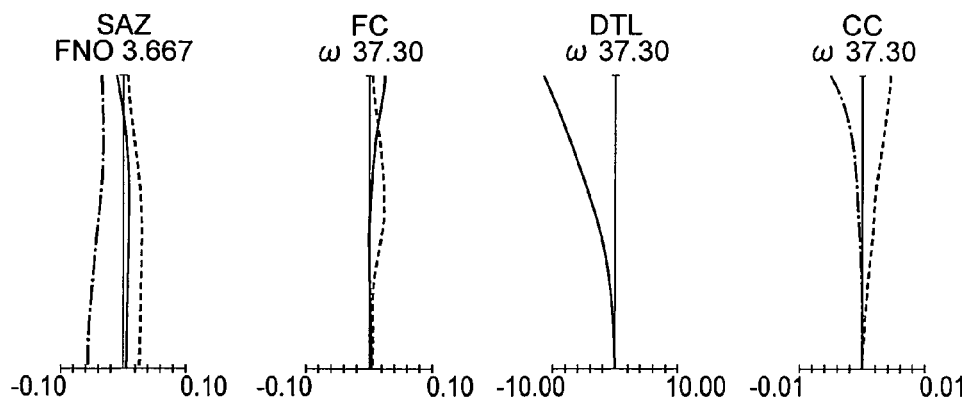
FIG. 4A, FIG. 4B, and FIG. 4C are diagrams showing a spherical aberration, an astigmatism, a distortion, and a chromatic aberration of magnification at the time of infinite object point focusing of the zoom lens according to the first embodiment, where.
Figure 4B:
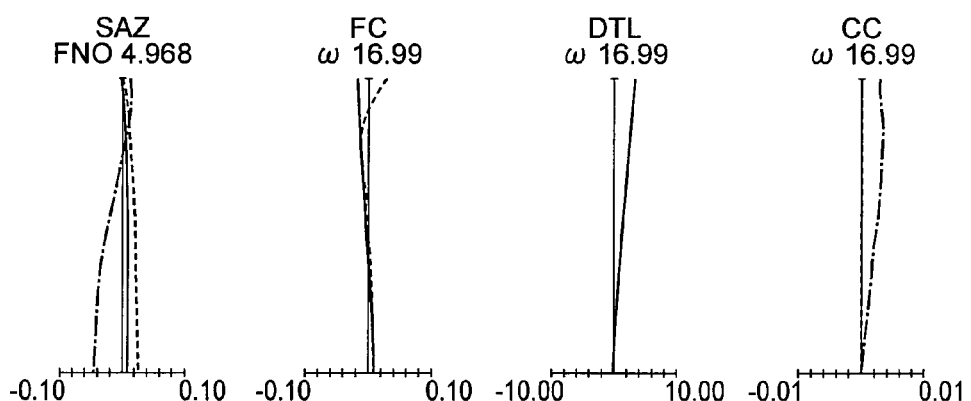
Figure 4C:
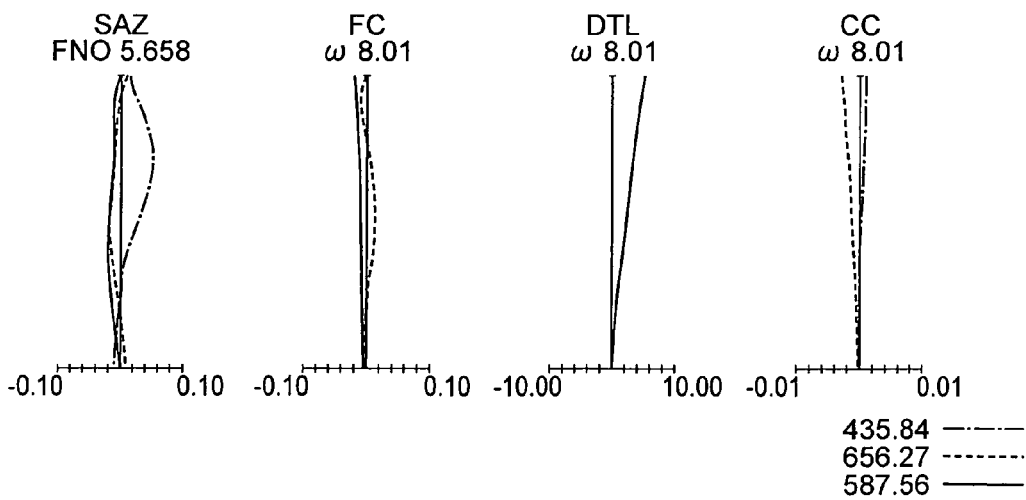

FIG. 4A, FIG. 4B, and FIG. 4C are diagrams showing a spherical aberration, an astigmatism, a distortion, and a chromatic aberration of magnification at the time of infinite object point focusing of the zoom lens according to the second embodiment, where, FIG. 4A shows a state at the wide angle end, FIG. 4B shows an intermediate focal length state, and FIG. 4C shows a state at the telephoto end.

The zoom lens of the second embodiment, as shown in FIG. 3A, FIG. 3B, and FIG. 3C, includes in order from an object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a negative refracting power, and a sixth lens group G6 having a positive refracting power. In all the following embodiments, in the lens cross-sectional views, CG denotes a cover glass and I denotes an image pickup surface of the electronic image pickup element.

The first lens group G1 includes in order from an object side, a negative meniscus lens L1 having a convex surface directed toward the object side, a prism L2, and a biconvex positive lens L3, and has a positive refracting power as a whole.

The second lens group G2 includes in order from the object side, a biconcave negative lens L4 and a positive meniscus lens L5 having a convex surface directed toward the object side, and has a negative refracting power as a whole.

The third lens group G3 includes a planoconvex positive lens L6 having a convex surface directed toward the object side, and has a positive refracting power as a whole.

The fourth lens group G4 includes a biconvex positive lens L7, and a cemented lens of a biconvex positive lens L8 and a negative meniscus lens L9 having a convex surface directed toward the image side, and has a positive refracting power as a whole.

The fifth lens group G5 includes a biconcave negative lens L10, and has a negative refracting power as a whole.

The sixth lens group G6 includes a positive meniscus lens L11 having a convex surface directed toward the image side, and has a positive refracting power as a whole.

At the time of zooming from the wide angle end to the telephoto end, the first lens group G1 is fixed. The second lens group G2 moves toward the image side. The third lens group G3 is fixed. The aperture stop S is also fixed. The fourth lens group G4 moves toward the object side. The fifth lens group G5 moves toward the object side. The sixth lens group G6 is fixed.

An aspheric surface is provided to a total of 12 surfaces namely, a surface on the image side of the negative meniscus lens L1 and both surfaces of the biconvex positive lens L2 in the first lens group G1, both surfaces of the biconcave negative lens and both surfaces of the positive meniscus lens L5 in the second lens group G2, a surface on the object side of the planoconvex positive lens L6 in the third lens group G3, both surfaces of the biconvex positive lens L7 and a surface on the object side of the negative meniscus lens L9 in the fourth lens group G4, and a surface on the object side of the positive meniscus lens L11 having the convex surface directed toward the image side in the sixth lens group G6.

Figure 5A:
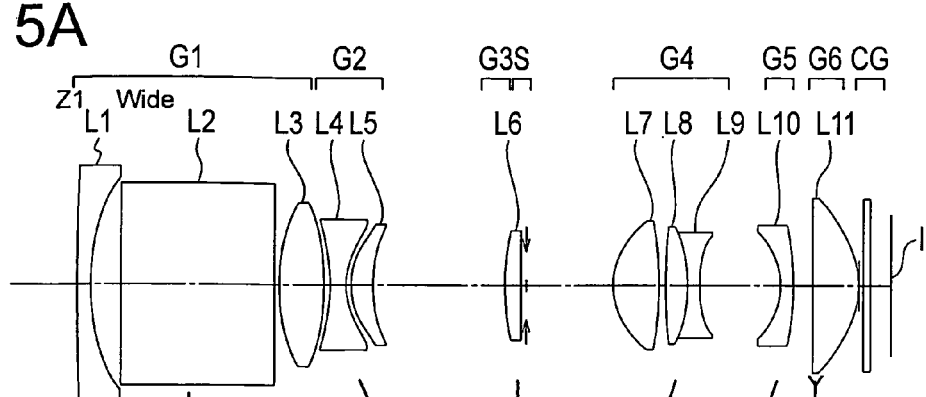
FIG. 5A, FIG. 5B, and FIG. 5C are cross-sectional views along an optical axis showing an optical arrangement at the time of infinite object point focusing of a zoom lens according to a third embodiment of the present invention, where.
Figure 5B:
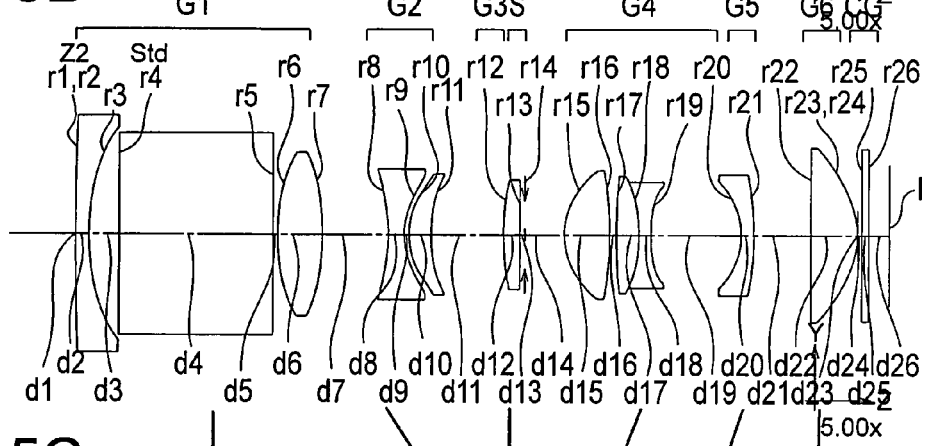
Figure 5C:
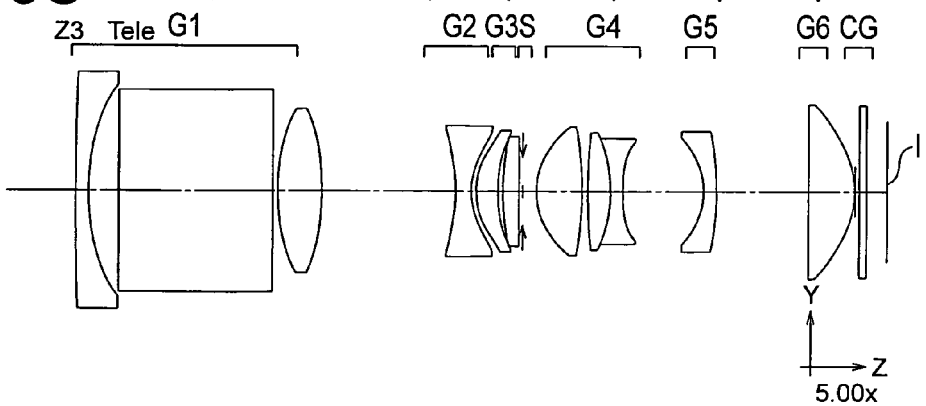

Next, a zoom lens according to a third embodiment of the present invention will be described below. FIG. 5A, FIG. 5B, and FIG. 5C are cross-sectional views along an optical axis showing an optical arrangement at the time of infinite object point focusing of the zoom lens according to the third embodiment, where, FIG. 5A shows a state at a wide angle end, FIG. 5B shows an intermediate focal length state, and FIG. 5C shows a state at a telephoto end.

Figure 6A:
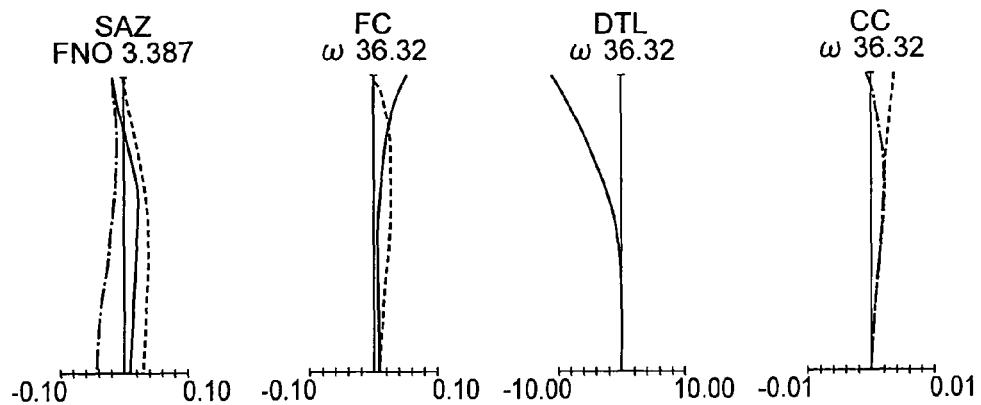
FIG. 6A, FIG. 6B, and FIG. 6C are diagrams showing a spherical aberration, an astigmatism, a distortion, and a chromatic aberration of magnification at the time of infinite object point focusing of the zoom lens according to the third embodiment, where.
Figure 6B:
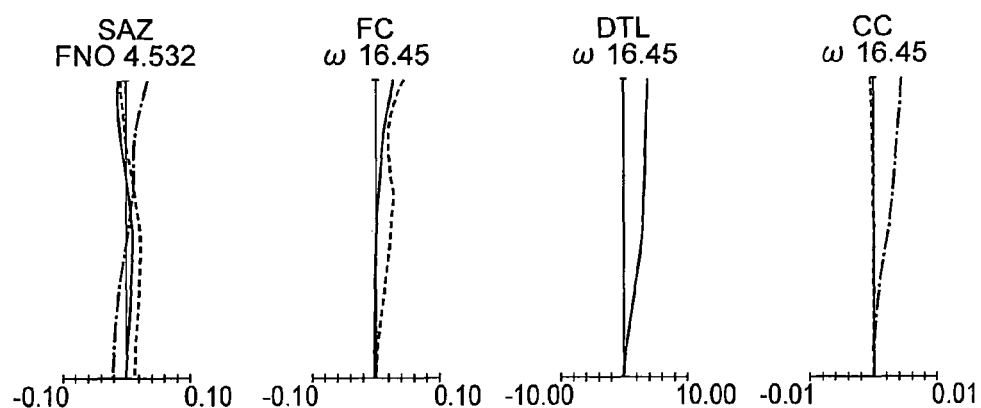
Figure 6C:
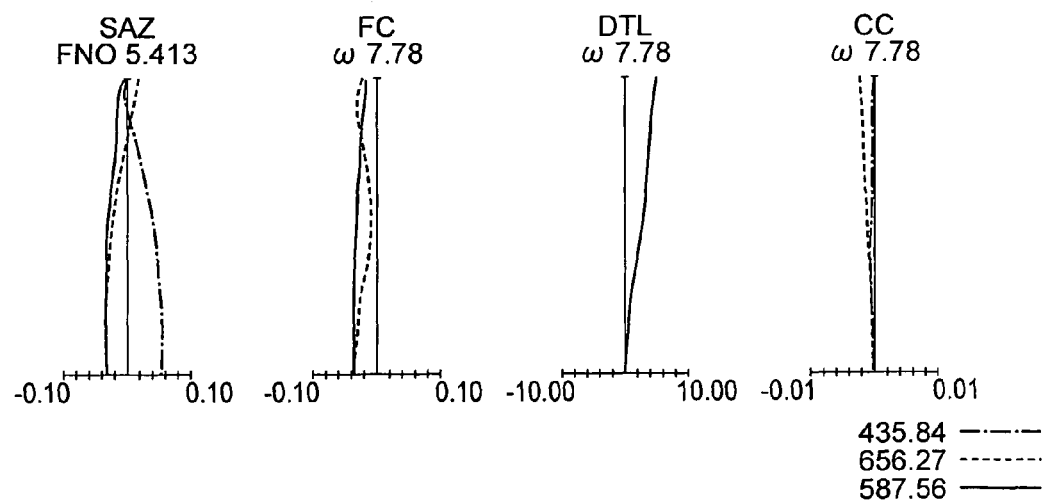

FIG. 6A, FIG. 6B, and FIG. 6C are diagrams showing a spherical aberration, an astigmatism, a distortion, and a chromatic aberration of magnification at the time of infinite object point focusing of the zoom lens according to the third embodiment, where, FIG. 6A shows a state at the wide angle end, FIG. 6B shows an intermediate focal length state, and FIG. 6C shows a state at the telephoto end.

The zoom lens of the third embodiment, as shown in FIG. 5A, FIG. 5B, and FIG. 5C, includes in order from an object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a negative refracting power, and a sixth lens group G6 having a positive refracting power. In all the following embodiments, in the lens cross-sectional views, CG denotes a cover glass and I denotes an image pickup surface of the electronic image pickup element.

The first lens group G1 includes in order from the object side, a negative meniscus lens L1 having a convex surface directed toward the object side, a prism L2, and a biconvex positive lens L3, and has a positive refracting power as a whole.

The second lens group G2 includes in order from the object side, a biconcave negative lens L4 and a positive meniscus lens L5 having a convex surface directed toward the object side, and has a negative refracting power as a whole.

The third lens group G3 includes a planoconvex positive lens L6 having a convex surface directed toward the object side, and has a positive refracting power as a whole.

The fourth lens group G4 includes a biconvex positive lens L7, and a cemented lens of a biconvex positive lens L8 and a biconcave lens L9, and has a positive refracting power as a whole.

The fifth lens group G5 includes a negative meniscus lens L10 having a convex surface directed toward the image side, and has a negative refracting power as a whole.

The sixth lens group G6 includes a positive meniscus lens L11 having a convex surface directed toward the image side, and has a positive refracting power as a whole.

At the time of zooming from the wide angle end to the telephoto end, the first lens group G1 is fixed. The second lens group G2 moves toward the image side. The third lens group G3 is fixed. The aperture stop S is also fixed. The fourth lens group G4 moves toward the object side. The fifth lens group G5 moves toward the object side. The sixth lens group G6 is fixed.

An aspheric surface is provided to a total of 12 surfaces namely, a surface on the image side of the negative meniscus lens L1 and both surfaces of the biconvex positive lens L2 in the first lens group G1, both surfaces of the biconcave negative lens L4 and both surfaces of the positive meniscus lens L5 in the second lens group G2, a surface on the object side of the planoconvex positive lens L6 in the third lens group G3, both surfaces of the biconvex positive lens L7 and a surface on the object side of the negative meniscus lens L9 in the fourth lens group G4, and a surface on the object side of the positive meniscus lens L11 having the convex surface directed toward the image side in the sixth lens group G6.

Figure 7A:
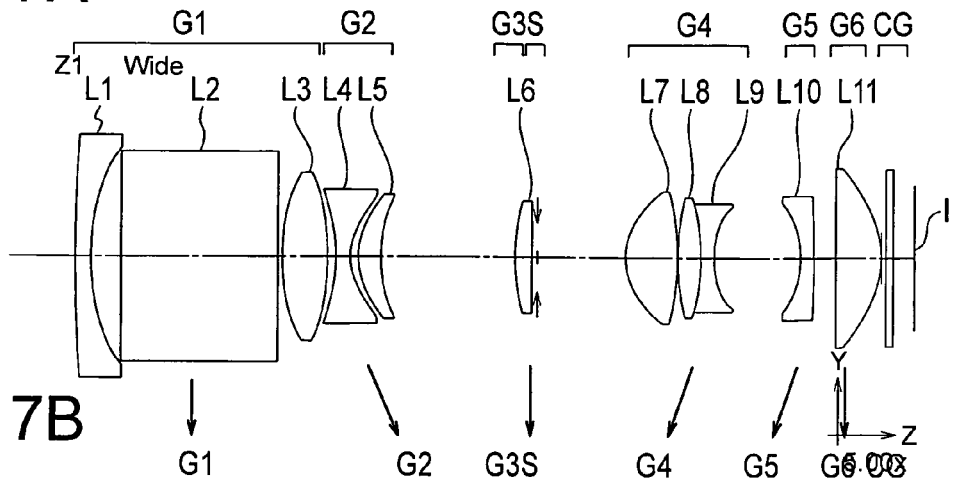
FIG. 7A, FIG. 7B, and FIG. 7C are cross-sectional views along an optical axis showing an optical arrangement at the time of infinite object point focusing of a zoom lens according to a fourth embodiment of the present invention, where.
Figure 7B:
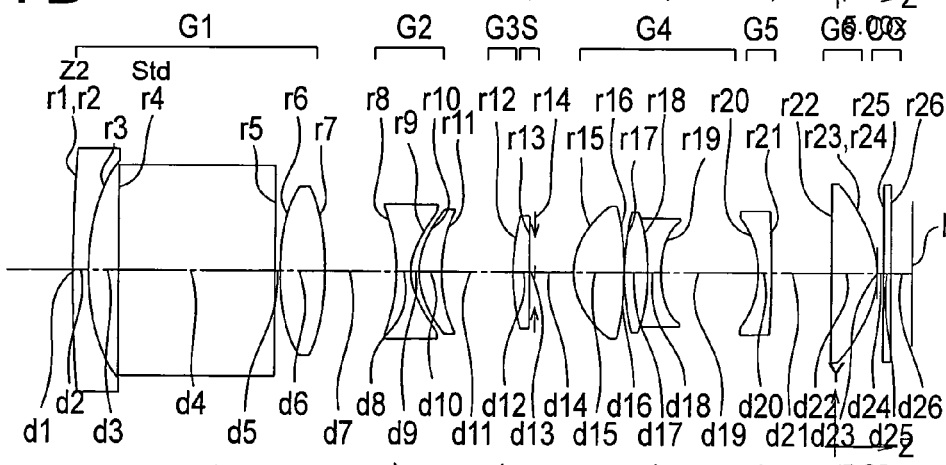
Figure 7C:
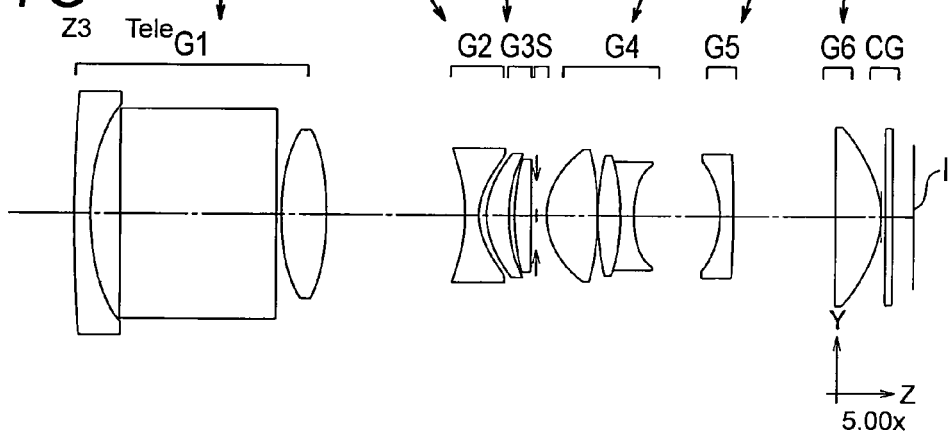

Next, a zoom lens according to a fourth embodiment of the present invention will be described below. FIG. 7A, FIG. 7B, and FIG. 7C are cross-sectional views along an optical axis showing an optical arrangement at the time of infinite object point focusing of the zoom lens according to the fourth embodiment, where, FIG. 7A shows a state at a wide angle end, FIG. 7B shows an intermediate focal length state, and FIG. 7C shows a state at a telephoto end.

Figure 8A:
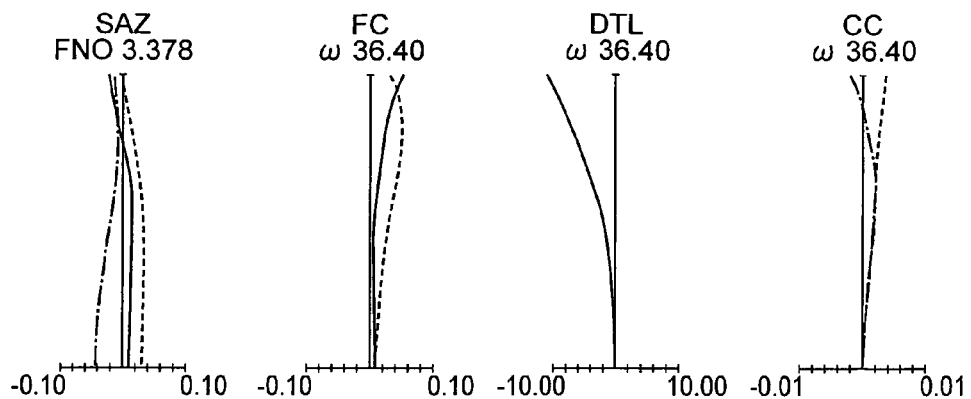
FIG. 8A, FIG. 8B, and FIG. 8C are diagrams showing a spherical aberration, an astigmatism, a distortion, and a chromatic aberration of magnification at the time of infinite object point focusing of the zoom lens according to the fourth embodiment, where.
Figure 8B:
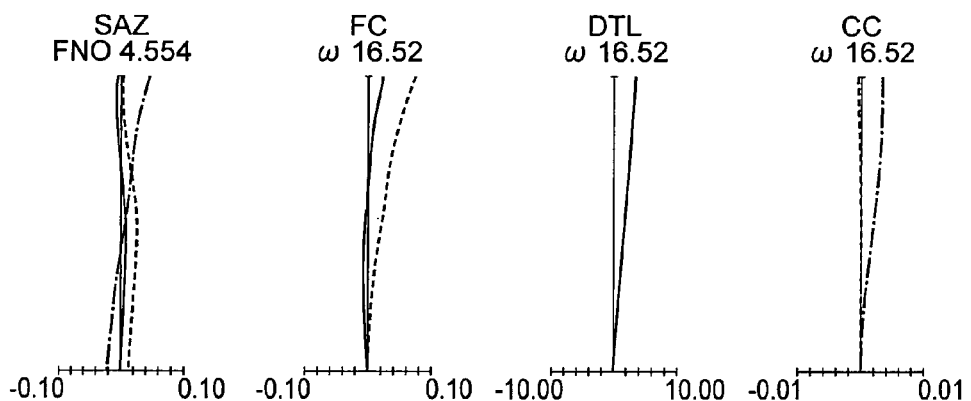
Figure 8C:
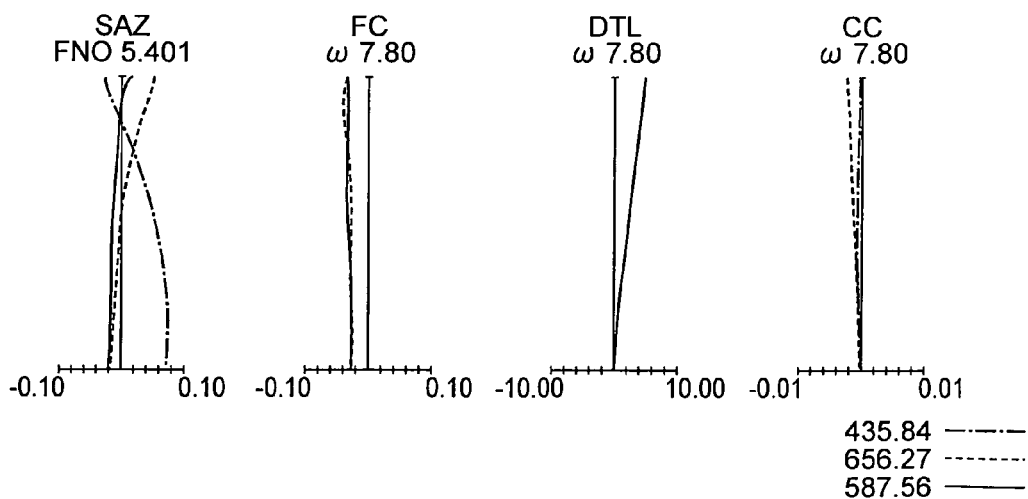

FIG. 8A, FIG. 8B, and FIG. 8C are diagrams showing a spherical aberration, an astigmatism, a distortion, and a chromatic aberration of magnification at the time of infinite object point focusing of the zoom lens according to the fourth embodiment, where, FIG. 8A shows a state at the wide angle end, FIG. 8B shows an intermediate focal length state, and FIG. 8C shows a state at the telephoto end.

The zoom lens of the fourth embodiment, as shown in FIG. 7A, FIG. 7B, and FIG. 7C, includes in order from an object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a negative refracting power, and a sixth lens group G6 having a positive refracting power. In all the following embodiments, in the lens cross-sectional views, CG denotes a cover glass and I denotes an image pickup surface of the electronic image pickup element.

The first lens group G1 includes in order from the object side, a negative meniscus lens L1 having a convex surface directed toward the object side, a prism L2, and a biconvex positive lens L3, and has a positive refracting power as a whole.

The second lens group G2 includes in order from the object side, a biconcave negative lens L4 and a positive meniscus lens L5 having a convex surface directed toward the object side, and has a negative refracting power as a whole.

The third lens group G3 includes a planoconvex positive lens L6 having a convex surface directed toward the object side, and has a positive refracting power as a whole.

The fourth lens group G4 includes a biconvex positive lens L7, and a cemented lens of a biconvex positive lens L8 and a biconcave lens L9, and has a positive refracting power as a whole.

The fifth lens group G5 includes a negative meniscus lens L10 having a convex surface directed toward the image side, and has a negative refracting power as a whole.

The sixth lens group G6 includes a positive meniscus lens L11 having a convex surface directed toward the image side, and has a positive refracting power as a whole.

At the time of zooming from the wide angle end to the telephoto end, the first lens group G1 is fixed. The second lens group G2 moves toward the image side. The third lens group G3 is fixed. The aperture stop S is also fixed. The fourth lens group G4 moves toward the object side. The fifth lens group G5 moves toward the object side. The sixth lens group G6 is fixed.

An aspheric surface is provided to a total of 12 surfaces namely, a surface on the image side of the negative meniscus lens L1 and both surfaces of the biconvex positive lens L2 in the first lens group G1, both surfaces of the biconcave negative lens L4 and both surfaces of the positive meniscus lens L5 in the second lens group G2, a surface on the object side of the planoconvex positive lens L6 in the third lens group G3, both surfaces of the biconvex positive lens L7 and a surface on the object side of the negative meniscus lens L9 in the fourth lens group G4, and a surface on the object side of the positive meniscus lens L11 having the convex surface directed toward the image side in the sixth lens group G6.

Figure 16A:
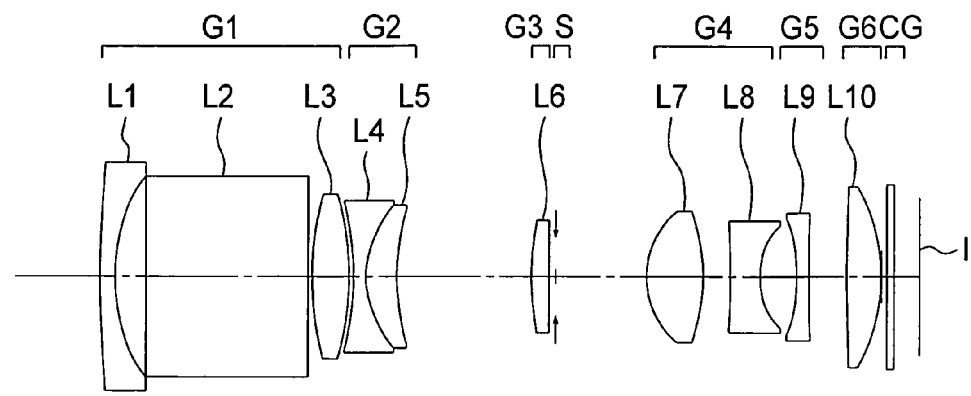
FIG. 16A, FIG. 16B, and FIG. 16c are cross-sectional views along an optical axis showing an optical arrangement at the time of infinite object point focusing of a zoom lens according to a fifth embodiment of the present invention, where.
Figure 16B:
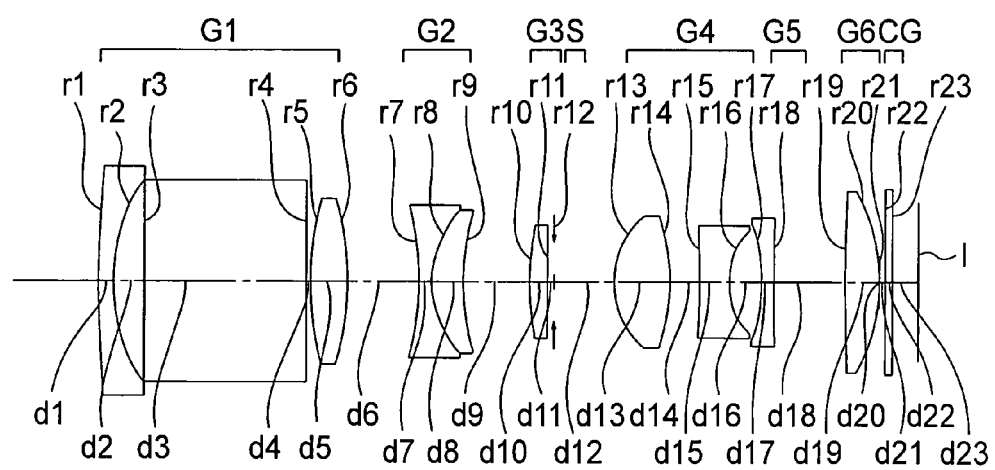
Figure 16C:
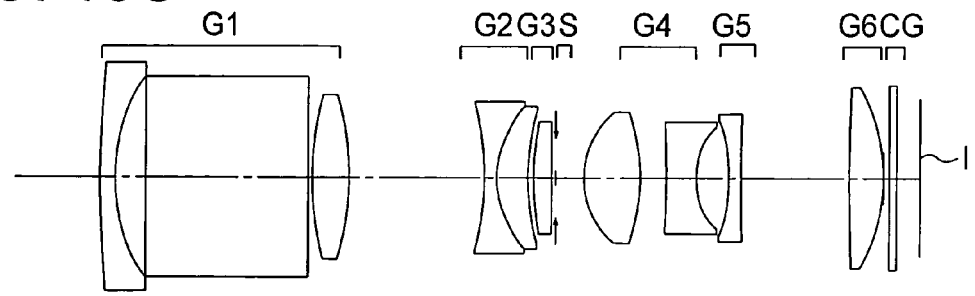

Next, a zoom lens according to a fifth embodiment of the present invention will be described below. FIG. 16A, FIG. 16B, and FIG. 16c are cross-sectional views along an optical axis showing an optical arrangement at the time of infinite object point focusing of the zoom lens according to the fifth embodiment, where, FIG. 16A shows a state at a wide angle end, FIG. 16B shows an intermediate focal length state, and FIG. 16C shows a state at a telephoto end.

Figure 17A:
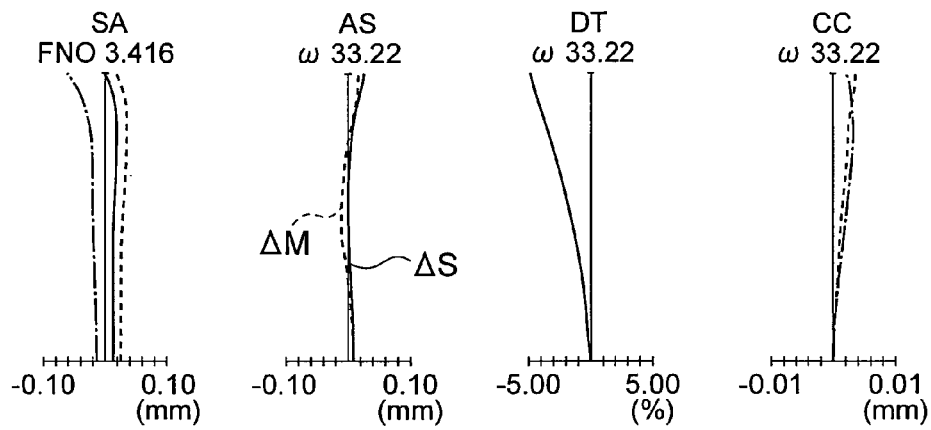
FIG. 17A, FIG. 17B, and FIG. 17C are diagrams showing a spherical aberration, an astigmatism, a distortion, and a chromatic aberration of magnification at the time of infinite object point focusing of the zoom lens according to the fifth embodiment, where.
Figure 17B:
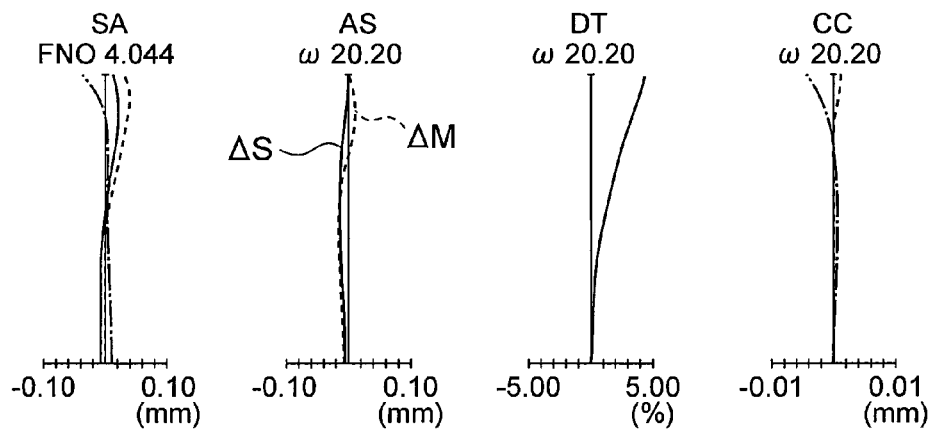
Figure 17C:
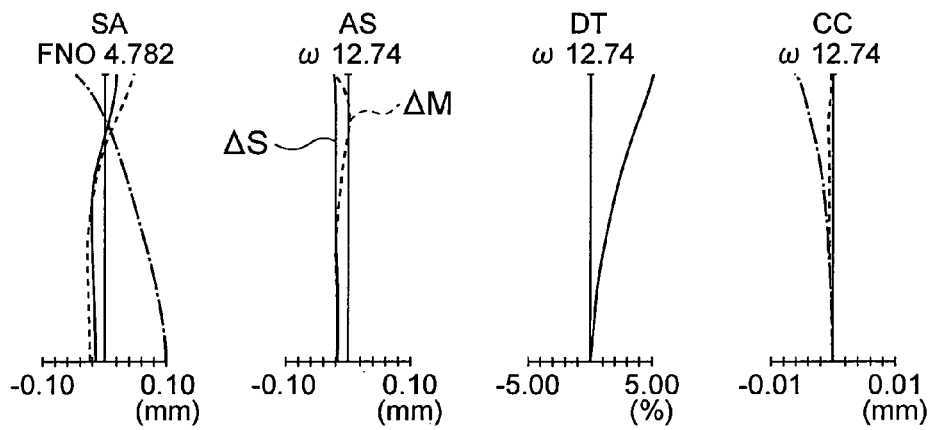

FIG. 17A, FIG. 17B, and FIG. 17C are diagrams showing a spherical aberration (SA), an astigmatism (AS), a distortion (DT), and a chromatic aberration of magnification (CC) at the time of infinite object point focusing of the zoom lens according to the fifth embodiment, where, FIG. 17A shows a state at the wide angle end, FIG. 17B shows an intermediate focal length state, and FIG. 17C shows a state at the telephoto end.

The zoom lens of the fifth embodiment, as shown in FIG. 16A, FIG. 16B, and FIG. 16C, includes in order from an object side, a first lens group G1 having a positive refracting power, a second lens group G2 having a negative refracting power, a third group G3 having a positive refracting power, an aperture stop S, a fourth lens group G4 having a positive refracting power, fifth lens group G5 having a negative refracting power, and a sixth lens group G6 having a positive refracting power.

The first lens group G1 includes in order from the object side, a negative meniscus lens L1 having a convex surface directed toward the object side, a prism L2, and a biconvex positive lens L3, and has a positive refracting power as a whole.

The second lens group G2 includes in order from the object side, a cemented lens of a biconcave negative lens L4 and a positive meniscus lens L5 having a convex surface directed toward the object side, and has a negative refracting power as a whole.

The third lens group G3 includes a planoconvex positive lens having a convex surface directed toward the object side, and has a positive refracting power as a whole.

The fourth lens group G4 includes a biconvex positive lens L7 and a biconcave negative lens L8, and has a positive refracting power as a whole.

The fifth lens group G5 includes a biconcave negative lens L9, and has a negative refracting power as a whole.

The sixth lens group G6 includes a biconvex positive lens L10, and has a positive refracting power as a whole.

At the time of zooming from the wide angle end to the telephoto end, the first lens group G1 is fixed. The second lens group G2 moves toward the image side. The third lens group G3 is fixed. The aperture stop S is also fixed. The fourth lens group G4 moves toward the object side. The fifth lens group G5 moves toward the object side. The sixth lens group G6 is fixed.

An aspheric surface is provided to a total of seven surfaces namely, both surfaces of the biconvex positive lens L3 in the first lens group G1, a surface on the object side of the planoconvex positive lens L6 having the convex surface directed toward the object side in the third lens group G3, a surface on the object side of the biconvex positive lens L7 and a surface on the image side of the biconcave negative lens L8 in the fourth lens group G4, a surface on the object side of the biconcave negative lens L9 in the fifth lens group G5, and a surface on the image side of the biconvex positive lens L10 in the sixth lens group G6.

Figure 18A:
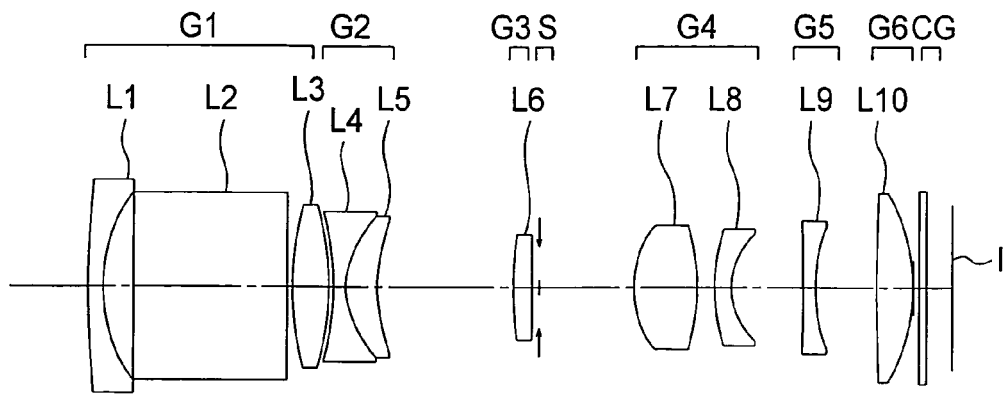
FIG. 18A, FIG. 18B, and FIG. 18C are cross-sectional views along an optical axis showing an optical arrangement at the time of infinite object point focusing of a zoom lens according to a sixth embodiment of the present invention, where.
Figure 18B:
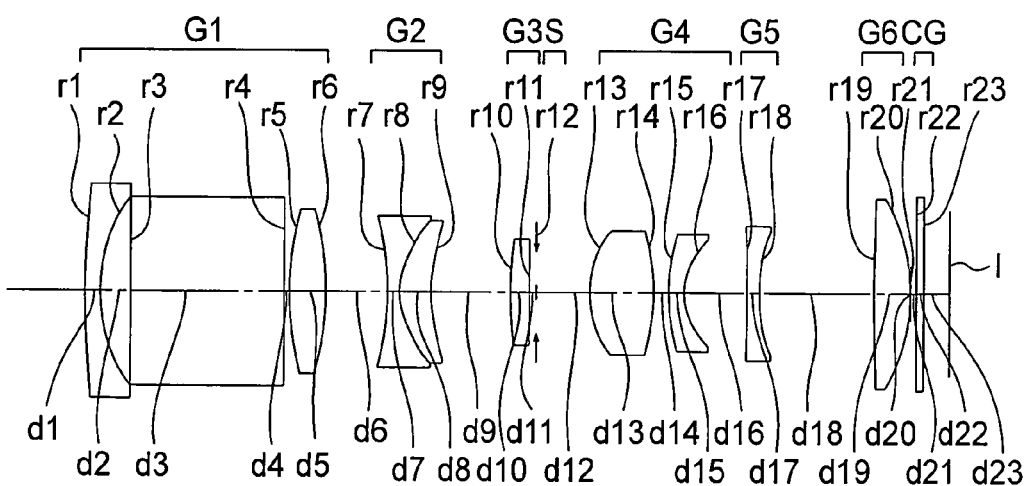
Figure 18C:
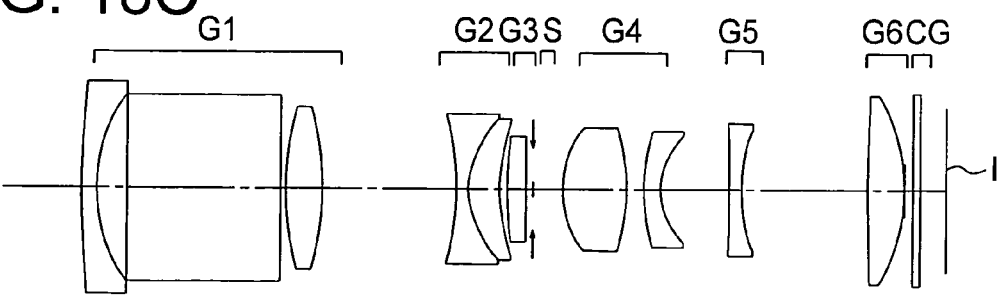

Next, a zoom lens according to a sixth embodiment of the present invention will be described below. FIG. 18A, FIG. 18B, and FIG. 18C are cross-sectional views along an optical axis showing an optical arrangement at the time of infinite object point focusing of the zoom lens according to the sixth embodiment of the present invention, where, FIG. 18A shows a state at a wide angle end, FIG. 18B shows an intermediate focal length state, and FIG. 18C shows a state at a telephoto end.

Figure 19A:
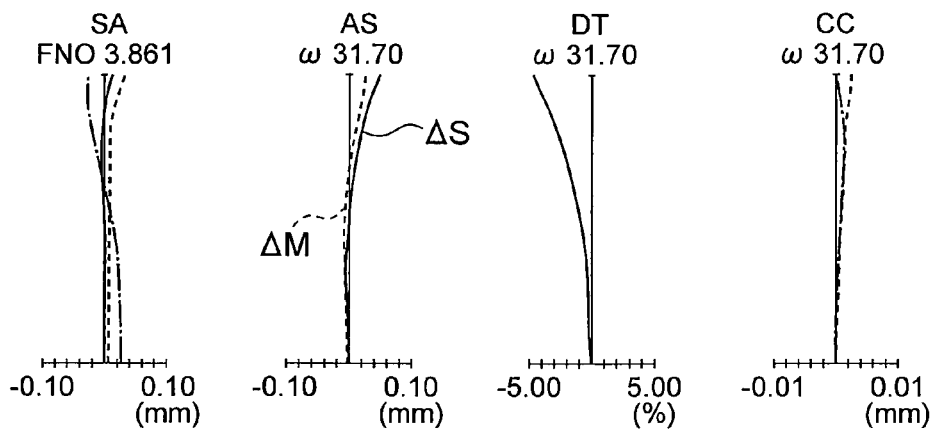
FIG. 19A, FIG. 19B, and FIG. 19C are diagrams showing a spherical aberration, an astigmatism, a distortion, and a chromatic aberration of magnification at the time of infinite object point focusing of the zoom lens according to the sixth embodiment, where.
Figure 19B:
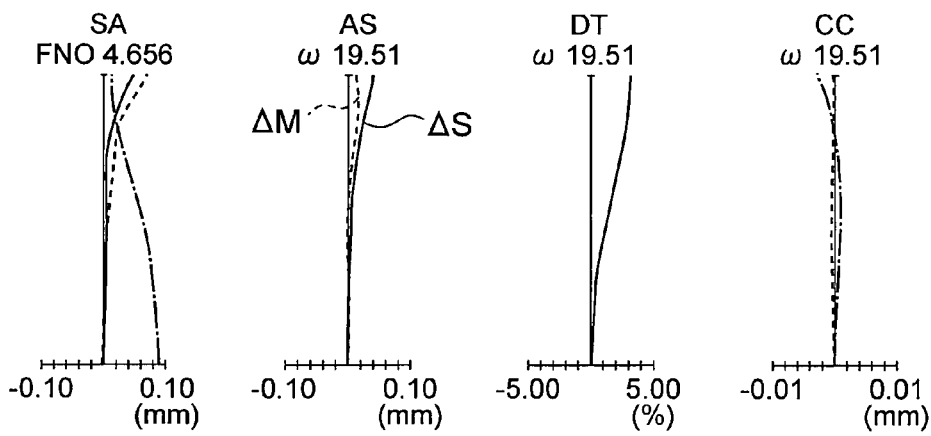
Figure 19C:
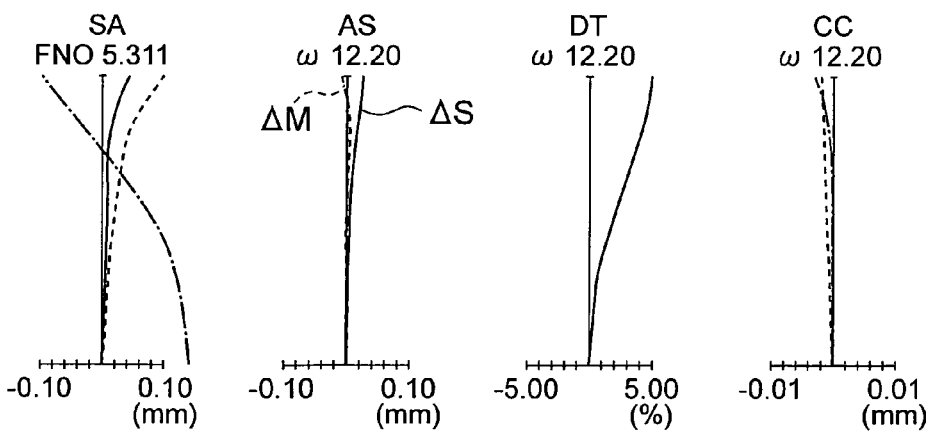

FIG. 19A, FIG. 19B, and FIG. 19C are diagrams showing a spherical aberration (SA), an astigmatism (AS), a distortion (DT), and a chromatic aberration of magnification (CC) at the time of infinite object point focusing of the zoom lens according to the sixth embodiment, where, FIG. 19A shows a state at the wide angle end, FIG. 19B shows an intermediate focal length state, and FIG. 19C shows a state at the telephoto end.

The zoom lens of the sixth embodiment, as shown in FIG. 18A, FIG. 18B, and FIG. 18C, includes in order from an object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a negative refracting power, and a sixth lens group G6 having a positive refracting power.

The first lens group G1 includes in order from the object side, a negative meniscus lens L1 having a convex surface directed toward the object side, a prism L2, and a biconvex positive lens L3, and has a positive refracting power as a whole.

The second lens group G2 includes in order from the object side, a cemented lens of a biconcave negative lens L4 and a positive meniscus lens L5 having a convex surface directed toward the object side, and has a negative refracting power as a whole.

The third lens group G3 includes a planoconvex positive lens L6 having a convex surface directed toward the object side, and has a positive refracting power as a whole.

The fourth lens group G4 includes a biconvex positive lens L7 and a negative meniscus lens L8 having a concave surface directed toward an image side, and has a positive refracting power as a whole.

The fifth lens group G5 includes a biconcave negative lens L9, and has a negative refracting power as a whole.

The sixth lens group G6 includes a biconvex positive lens L10, and has a positive refracting power as a whole.

At the time of zooming from the wide angle end to the telephoto end, the first lens group G1 is fixed. The second lens group G2 moves toward the image side. The third lens group G3 is fixed. The aperture stop S is also fixed. The fourth lens group G4 moves toward the object side. The fifth lens group G5 moves toward the object side. The sixth lens group G6 is fixed.

An aspheric surface is provided to a total of six surfaces namely, a surface on the object side of the biconvex positive lens L2 in the first lens group G1, a surface on the object side of the planoconvex positive lens L6 in the third lens group G3, both surfaces of the biconvex positive lens L7 in the fourth lens group G4, a surface on the object side of the biconcave negative lens L9 on the image side in the fifth lens group G5, and a surface on the image side of the biconvex positive lens L10 in the sixth lens group G6.

Figure 20A:
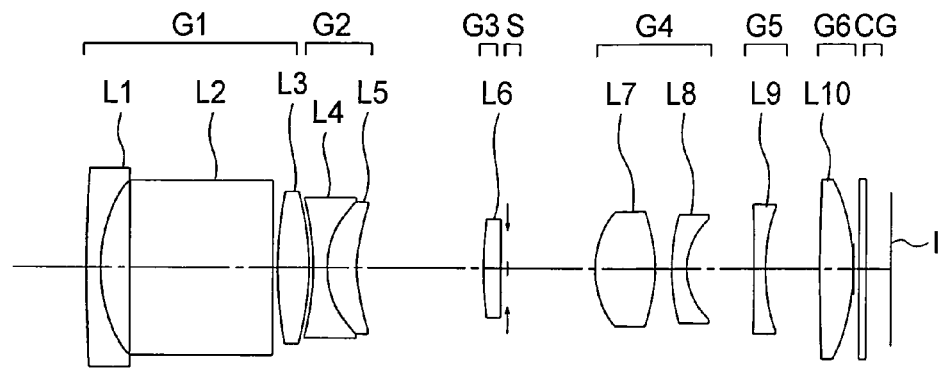
FIG. 20A, FIG. 20B, and FIG. 20C are cross-sectional views along an optical axis showing an optical arrangement at the time of infinite object point focusing of a zoom lens according to a seventh embodiment of the present invention, where.
Figure 20B:
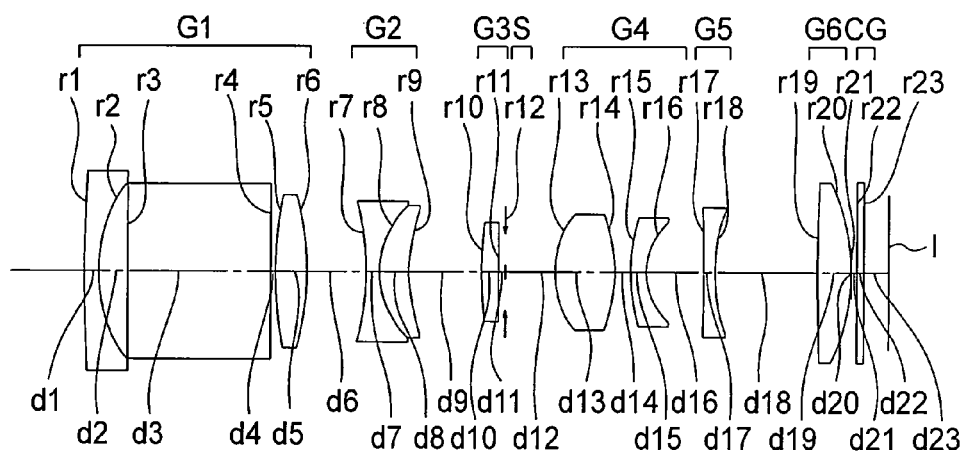
Figure 20C:
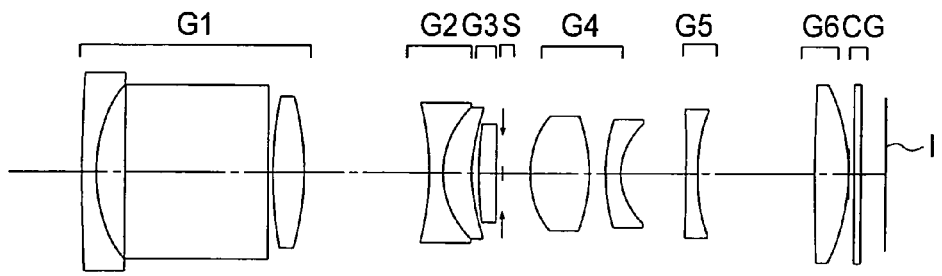

Next, a zoom lens according to a seventh embodiment of the present invention will be described below. FIG. 20A, FIG. 20B, and FIG. 20C are cross-sectional views along an optical axis showing an optical arrangement at the time of infinite object point focusing of the zoom lens according to the seventh embodiment of the present invention, where, FIG. 20A shows a state at a wide angle end, FIG. 20B shows an intermediate focal length state, and FIG. 20C shows a state at a telephoto end.

Figure 21A:
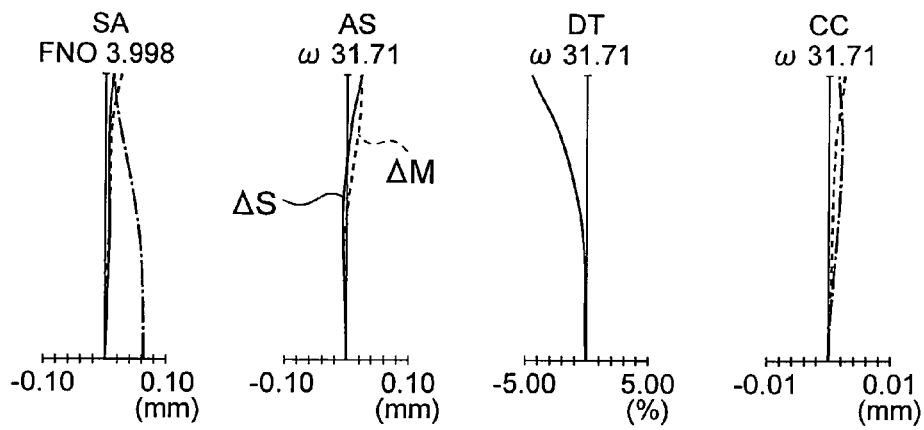
FIG. 21A, FIG. 21B, and FIG. 21C are diagrams showing a spherical aberration, an astigmatism, a distortion, and a chromatic aberration of magnification at the time of infinite object point focusing of the zoom lens according to the seventh embodiment, where.
Figure 21B:
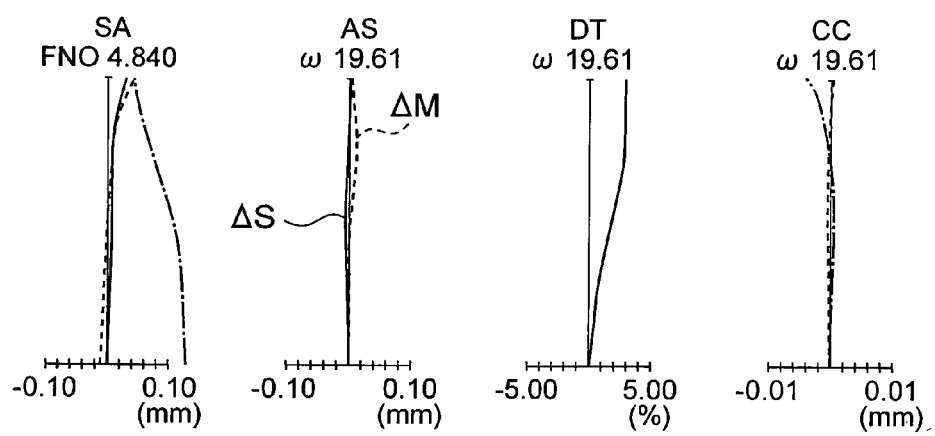
Figure 21C:
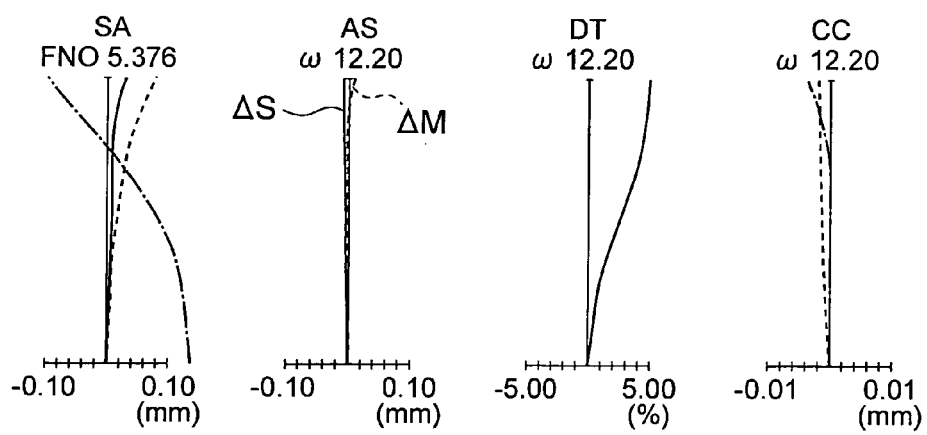

FIG. 21A, FIG. 21B, and FIG. 21C are diagrams showing a spherical aberration (SA), an astigmatism (AS), a distortion (DT), and a chromatic aberration of magnification (CC) at the time of infinite object point focusing of the zoom lens according to the seventh embodiment, where, FIG. 21A shows a state at the wide angle end, FIG. 21B shows an intermediate focal length state, and FIG. 21C shows a state at the telephoto end.

The zoom lens of the seventh embodiment, as shown in FIG. 20A, FIG. 20B, and FIG. 20C, includes in order from an object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a negative refracting power, and a sixth lens group G6 having a positive refracting power.

The first lens group G1 includes in order from the object side, a negative meniscus lens L1 having a convex surface directed toward the object side, a prism L2, and a biconvex positive lens L3, and has a positive refracting power as a whole.

The second lens group G2 includes in order from the object side, a cemented lens of a biconcave negative lens L4 and a positive meniscus lens L5 having a convex surface directed toward the object side, and has a negative refracting power as a whole.

The third lens group G3 includes a planoconvex positive lens L6 having a convex surface directed toward the object side, and has a positive refracting power as a whole.

The fourth lens group G4 includes a biconvex positive lens L7 and a negative meniscus lens L8 having a concave surface directed toward an image side, and has a positive refracting power as a whole.

The fifth lens group G5 includes a negative meniscus lens L9 having a concave surface directed toward the image side, and has a negative refracting power as a whole.

The sixth lens group G6 includes a biconvex positive lens L10, and has a positive refracting power as a whole.

At the time of zooming from the wide angle end to the telephoto end, the first lens group G1 is fixed. The second lens group G2 moves toward the image side. The third lens group G3 is fixed. The aperture stop S is also fixed. The fourth lens group G4 moves toward the object side. The fifth lens group G5 moves toward the object side. The sixth lens group G6 is fixed.

An aspheric surface is provided to a total of six surfaces namely, a surface on the object side of the biconvex positive lens L3 in the first lens group G1, a surface on the object side of the planoconvex positive lens L6 in the third lens group G3, both surfaces of the biconvex positive lens L7 in the fourth lens group G4, a surface on the object side of the negative meniscus lens L9 having the concave surface directed toward the image side in the fifth lens group G5, and a surface on the image side of the biconvex positive lens L10 in the sixth lens group G6.

Numerical data of each embodiment described above is shown below. Each of r1, r2, . . . denotes radius of curvature of each lens surface, each of d1, d2, . . . denotes a lens thickness or an air distance between two lenses, each of nd1, nd2, . . . denotes a refractive index of each lens for a d-line, and each of vd1, vd2, . . . denotes an Abbe's number for each lens. Further, $F_{NO}$ denotes an F number, f denotes a focal length of the entire zoom lens system, D0 denotes a distance from the object to the first surface of the lens system, and * denotes an aspheric data.

When z is let to be an optical axis with a direction of traveling of light as a positive direction, and y is let to be in a direction orthogonal to the optical axis, a shape of the aspheric surface is described by the following expression (I).

$$z=(y^2/r)/[1+\{1-(K+1)(y/r)^2\}^{1/2}]+A_4 y^4+A_6 y^6+A_8 y^8+A_{10}y^{10} \quad (I)$$

where, r denotes a paraxial radius of curvature, K denotes a conical coefficient, A4, A6, A8, A10 denote aspherical surface coefficients of a fourth order, a sixth order, an eight order, a tenth order, and a twelfth order respectively. Moreover, in the aspherical surface coefficients, 'E−n' (where, n is an integral number) indicates '$10^{-n}$'. These references are used in following examples in common.

Numerical Example 1

| unit mm | | | | | |
|---|---|---|---|---|---|
| Surface data | | | | | |
| Surface no. | r | d | nd | vd | ER |
| Object plane | ∞ | ∞ | | | |
| 1 | ∞ | 0.00 | | | 3.774 |
| 2 | 85.3974 | 0.6000 | 1.82918 | 24.06 | 3.728 |
| 3* | 9.5867 | 1.2221 | | | 3.362 |
| 4 | ∞ | 6.0000 | 1.91048 | 31.32 | 3.261 |
| 5 | ∞ | 0.2000 | | | 2.685 |
| 6* | 8.6257 | 1.7832 | 1.59412 | 67.02 | 2.575 |
| 7* | −8.7914 | Variable | | | 2.700 |
| 8* | −8.5116 | 0.6000 | 1.74678 | 49.34 | 2.200 |
| 9* | 2.6048 | 0.2922 | | | 1.947 |
| 10* | 3.4706 | 0.9153 | 1.63895 | 23.27 | 1.969 |
| 11* | 15.6941 | Variable | | | 1.920 |
| 12* | 9.9874 | 0.6212 | 1.53296 | 55.69 | 1.571 |
| 13 | ∞ | 0.2000 | | | 1.527 |
| 14 (stop) | ∞ | Variable | | | 1.500 |

19

-continued unit mm

| | | | | | |
|---|---|---|---|---|---|
| 15* | 3.5841 | 2.1753 | 1.53296 | 55.69 | 2.150 |
| 16* | −12.6232 | 0.2989 | | | 2.005 |
| 17 | 14.8979 | 1.3733 | 1.49846 | 81.54 | 1.850 |
| 18 | −3.5926 | 1.8322 | 1.82918 | 24.06 | 1.662 |
| 19* | −27.2290 | Variable | | | 1.496 |
| 20 | −4.5358 | 0.5000 | 1.83945 | 42.71 | 1.404 |
| 21 | 7.1978 | Variable | | | 1.489 |
| 22 | 131.7049 | 2.0199 | 1.53296 | 55.69 | 1.810 |
| 23* | −3.2968 | 0. | | | 2.147 |
| 24 | ∞ | 0.2000 | | | 2.206 |
| 25 | ∞ | 0.3000 | 1.51825 | 64.14 | 2.226 |
| 26 | ∞ | 0.8000 | | | 2.245 |
| Image plane | ∞ | | | | |

Aspherical surface data

3rd surface $K = -2.6653$
$A2 = 0.0000E+00, A4 = 9.8957E-04, A6 = -4.6394E-06,$
$A8 = 0.0000E+00, A10 = 0.0000E+00$ 6th surface $K = -1.4021$
$A2 = 0.0000E+00, A4 = 3.9080E-04, A6 = -7.6021E-06,$
$A8 = 0.0000E+00, A10 = 0.0000E+00$ 7th surface $K = -0.2430$
$A2 = 0.0000E+00, A4 = 5.6987E-04, A6 = -6.0011E-06,$
$A8 = 0.0000E+00, A10 = 0.0000E+00$ 8th surface $K = 6.0552$
$A2 = 0.0000E+00, A4 = 7.4503E-04, A6 = -8.9224E-05,$
$A8 = 3.0230E-05, A10 = 0.0000E+00$ 9th surface $K = -3.4390$
$A2 = 0.0000E+00, A4 = 1.0196E-02, A6 = -7.2796E-04,$
$A8 = -1.0260E-04, A10 = 0.0000E+00$ 10th surface $K = -2.8336$
$A2 = 0.0000E+00, A4 = -1.7718E-03, A6 = 2.0966E-03,$
$A8 = -3.2212E-04, A10 = 0.0000E+00$ 11th surface $K = 10.0000$
$A2 = 0.0000E+00, A4 = -3.6624E-03, A6 = 7.5573E-04,$
$A8 = -3.5997E-05, A10 = 0.0000E+00$ 12th surface $K = -0.0803$
$A2 = 0.0000E+00, A4 = -4.3727E-04, A6 = 6.1016E-06,$
$A8 = 0.0000E+00, A10 = 0.0000E+00$ 15th surface $K = -0.7845$
$A2 = 0.0000E+00, A4 = 1.5174E-03, A6 = 8.7073E-05,$
$A8 = -9.7159E-06, A10 = 0.0000E+00$ 16th surface $K = -4.0500$
$A2 = 0.0000E+00, A4 = 5.2919E-04, A6 = -1.2661E-04,$
$A8 = -8.2475E-06, A10 = 0.0000E+00$ 19th surface $K = 10.0000$
$A2 = 0.0000E+00, A4 = 5.0326E-03, A6 = 2.7641E-04,$
$A8 = 1.8485E-04, A10 = 0.0000E+00$ 23rd surface $K = -4.2859$
$A2 = 0.0000E+00, A4 = -3.3025E-03, A6 = 6.7681E-05,$
$A8 = 0.0000E+00, A10 = 0.0000E+00$

20

-continued unit mm

Numerical data
Zoom ratio 4.59

| | Wide angle | Intermediate | Telephoto |
|---|---|---|---|
| Focal length | 4.42534 | 9.47561 | 20.29298 |
| Fno. | 3.7337 | 4.9553 | 5.5498 |
| 2ω(°) | 73.02 | 32.98 | 15.54 |
| Image height | 2.9 | 2.9 | 2.9 |
| Lens total length | 32.9977 | 32.9961 | 33.0000 |
| BF | 0.80336 | 0.80336 | 0.80336 |
| d7 | 0.20000 | 2.67951 | 5.48323 |
| d11 | 5.38250 | 2.90335 | 0.10000 |
| d14 | 3.34694 | 1.59920 | 0.80000 |
| d19 | 1.18070 | 1.26308 | 0.72923 |
| d21 | 0.95408 | 2.61745 | 3.95408 |

Zoom lens group data

| Group | Initial surface | focal length |
|---|---|---|
| 1 | 1 | 9.44058 |
| 2 | 8 | −4.47959 |
| 3 | 12 | 18.73946 |
| 4 | 15 | 5.94421 |
| 5 | 20 | −3.25134 |
| 6 | 22 | 6.06624 |

Numerical Example 2 unit mm

Surface data

| Surface no. | r | d | nd | vd | ER |
|---|---|---|---|---|---|
| Object plane | ∞ | ∞ | | | |
| 1 | ∞ | 0. | | | 4.394 |
| 2 | 86.1593 | 0.6000 | 1.82918 | 24.06 | 4.308 |
| 3* | 9.3401 | 1.2513 | | | 3.761 |
| 4 | ∞ | 6.0000 | 1.91048 | 31.32 | 3.667 |
| 5 | ∞ | 0.2000 | | | 2.842 |
| 6* | 8.6947 | 1.8017 | 1.59412 | 67.02 | 2.674 |
| 7* | −8.4514 | Variable | | | 2.700 |
| 8* | −7.9490 | 0.6000 | 1.74678 | 49.34 | 2.200 |
| 9* | 2.4887 | 0.2419 | | | 1.944 |
| 10* | 3.0988 | 0.9389 | 1.63895 | 23.27 | 1.969 |
| 11* | 12.0059 | Variable | | | 1.902 |
| 12* | 8.7468 | 0.6483 | 1.53296 | 55.69 | 1.575 |
| 13 | ∞ | 0.2000 | | | 1.528 |
| 14 (stop) | ∞ | Variable | | | 1.500 |
| 15* | 3.4860 | 2.0770 | 1.53296 | 55.69 | 2.150 |
| 16* | −10.2026 | 0.3228 | | | 2.051 |
| 17 | 21.4092 | 1.2904 | 1.49846 | 81.54 | 1.886 |
| 18 | −3.7739 | 2.2943 | 1.82918 | 24.06 | 1.724 |
| 19* | −238.8563 | Variable | | | 1.546 |
| 20 | −4.2982 | 0.5000 | 1.83945 | 42.71 | 1.559 |
| 21 | 10.1628 | Variable | | | 1.735 |
| 22 | −321.3296 | 2.0241 | 1.53296 | 55.69 | 2.180 |
| 23* | −3.1786 | 0. | | | 2.578 |
| 24 | ∞ | 0.2000 | | | 2.761 |
| 25 | ∞ | 0.3000 | 1.51825 | 64.14 | 2.801 |
| 26 | ∞ | 0.8000 | | | 2.841 |
| Image plane | ∞ | | | | |

-continued unit mm

Aspherical surface data

3rd surface

K = −2.8669
A2 = 0.0000E+00, A4 = 1.0237E−03, A6 = −3.8692E−06,
A8 = 0.0000E+00, A10 = 0.0000E+00

6th surface

K = −1.6136
A2 = 0.0000E+00, A4 = 3.5721E−04, A6 = −3.5344E−06,
A8 = 0.0000E+00, A10 = 0.0000E+00

7th surface

K = −0.2595
A2 = 0.0000E+00, A4 = 5.6024E−04, A6 = −2.3892E−06,
A8 = 0.0000E+00, A10 = 0.0000E+00

8th surface

K = 4.1179
A2 = 0.0000E+00, A4 = 1.1486E−03, A6 = −1.7980E−04,
A8 = 2.9249E−05, A10 = 0.0000E+00

9th surface

K = −3.2055
A2 = 0.0000E+00, A4 = 9.6490E−03, A6 = −3.9387E−04,
A8 = −1.5704E−04, A10 = 0.0000E+00

10th surface

K = −2.7902
A2 = 0.0000E+00, A4 = −1.1654E−03, A6 = 2.2599E−03,
A8 = −2.7782E−04, A10 = 0.0000E+00

11th surface

K = 8.6884
A2 = 0.0000E+00, A4 = −3.5925E−03, A6 = 6.0791E−04,
A8 = 7.0546E−05, A10 = 0.0000E+00

12th surface

K = −0.0187
A2 = 0.0000E+00, A4 = −4.1281E−04, A6 = −1.2040E−05,
A8 = 0.0000E+00, A10 = 0.0000E+00

15th surface

K = −0.8674
A2 = 0.0000E+00, A4 = 1.2723E−03, A6 = 3.4361E−05,
A8 = −9.3243E−06, A10 = 0.0000E+00

16th surface

K = −1.3538
A2 = 0.0000E+00, A4 = 1.4617E−04, A6 = −1.6684E−04,
A8 = 2.9198E−06, A10 = 0.0000E+00

19th surface

K = −10.0000
A2 = 0.0000E+00, A4 = 7.0989E−03, A6 = 7.4291E−04,
A8 = 2.0211E−04, A10 = 0.0000E+00

23rd surface

K = −4.1125
A2 = 0.0000E+00, A4 = −3.3921E−03, A6 = 5.9579E−05,
A8 = 0.0000E+00, A10 = 00000E+00

Numerical data
Zoom ratio 4.59

| | Wide angle | Intermediate | Telephoto |
|---|---|---|---|
| Focal length | 4.29104 | 9.18774 | 19.67560 |
| Fno. | 3.6672 | 4.9680 | 5.6583 |
| 2ω (°) | 74.66 | 33.97 | 16.02 |
| Image height | 2.9 | 2.9 | 2.9 |
| Lens total length | 32.9986 | 32.9980 | 33.0000 |
| BF | 0.79241 | 0.79241 | 0.79241 |
| d7 | 0.20025 | 2.50695 | 5.17188 |
| d11 | 5.06826 | 2.76199 | 0.10000 |
| d14 | 3.64680 | 1.72771 | 0.80000 |
| d19 | 0.87034 | 1.00172 | 0.71512 |
| d21 | 0.92227 | 2.70887 | 3.92227 |

Zoom lens group data

| Group | Initial surface | focal length |
|---|---|---|
| 1 | 1 | 9.22373 |
| 2 | 8 | −4.23629 |
| 3 | 12 | 16.41181 |
| 4 | 15 | 6.08071 |
| 5 | 20 | −3.54248 |
| 6 | 22 | 6.01026 |

Numerical Example 3 unit mm

Surface data

| Surface no. | r | d | nd | vd | ER |
|---|---|---|---|---|---|
| Object plane | ∞ | ∞ | | | |
| 1 | ∞ | 0.00 | | | 4.433 |
| 2 | 86.9809 | 0.6000 | 1.82918 | 24.06 | 4.349 |
| 3* | 8.5753 | 1.2744 | | | 3.805 |
| 4 | ∞ | 6.1000 | 1.91048 | 31.32 | 3.709 |
| 5 | ∞ | 0.2000 | | | 2.861 |
| 6* | 7.5216 | 1.7869 | 1.59412 | 67.02 | 2.677 |
| 7* | −10.1560 | Variable | | | 2.700 |
| 8* | −7.2687 | 0.6000 | 1.69661 | 53.21 | 2.200 |
| 9* | 2.6700 | 0.2613 | | | 1.975 |
| 10* | 3.3209 | 0.9348 | 1.63895 | 23.27 | 2.020 |
| 11 | 10.2543 | Variable | | | 1.936 |
| 12* | 10.6592 | 0.6419 | 1.53296 | 55.69 | 1.762 |
| 13 | ∞ | 0.2000 | | | 1.723 |
| 14 (stop) | ∞ | Variable | | | 1.700 |
| 15* | 3.1262 | 1.8948 | 1.53296 | 55.69 | 2.100 |
| 16* | −16.4049 | 0.1744 | | | 1.968 |
| 17 | 16.4713 | 0.9630 | 1.49846 | 81.54 | 1.848 |
| 18 | −6.3526 | 0.5000 | 1.82918 | 24.06 | 1.703 |
| 19* | 10.4286 | Variable | | | 1.581 |
| 20 | −3.0406 | 0.5000 | 1.83945 | 42.71 | 1.722 |
| 21 | −11.1234 | Variable | | | 2.000 |
| 22 | −66.6824 | 1.8992 | 1.53296 | 55.69 | 2.434 |
| 23* | −2.9552 | 0. | | | 2.722 |
| 24 | ∞ | 0.2000 | | | 2.846 |
| 25 | ∞ | 0.3000 | 1.51825 | 64.14 | 2.872 |
| 26 | ∞ | 0.8000 | | | 2.897 |
| Image plane | ∞ | | | | |

Aspherical surface data

3rd surface

K = −1.9371
A2 = 0.0000E+00, A4 = 5.5247E−04, A6 = 0.0000E+00,
A8 = 0.0000E+00, A10 = 0.0000E+00

6th surface

K = −1.4941
A2 = 0.0000E+00, A4 = 1.1818E−04, A6 = 0.0000E+00,
A8 = 0.0000E+00, A10 = 0.0000E+00

7th surface

K = −0.7572
A2 = 0.0000E+00, A4 = 2.4976E−04, A6 = 0.0000E+00,
A8 = 0.0000E+00, A10 = 0.0000E+00

-continued unit mm

8th surface

K = 3.9299
A2 = 0.0000E+00, A4 = −3.7667E−04, A6 = 3.4821E−04,
A8 = 0.0000E+00, A10 = 0.0000E+00
9th surface K = −2.3587
A2 = 0.0000E+00, A4 = 4.0993E−03, A6 = −6.3075E−04,
A8 = 0.0000E+00, A10 = 0.0000E+00
10th surface K = −3.5865
A2 = 0.0000E+00, A4 = 8.6669E−03, A6 = −1.8716E−04,
A8 = 0.0000E+00, A10 = 0.0000E+00
11th surface K = −3.9549
A2 = 0.0000E+00, A4 = 9.2972E−04, A6 = 9.4486E−04,
A8 = 0.0000E+00, A10 = 0.0000E+00
12th surface K = −1.0261
A2 = 0.0000E+00, A4 = −3.6334E−04, A6 = 0.0000E+00,
A8 = 0.0000E+00, A10 = 0.0000E+00
15th surface K = −0.6743
A2 = 0.0000E+00, A4 = 1.9383E−03, A6 = 1.2820E−04,
A8 = 0.0000E+00, A10 = 0.0000E+00
16th surface K = 1.1097
A2 = 0.0000E+00, A4 = −6.2873E−04, A6 = 0.0000E+00,
A8 = 0.0000E+00, A10 = 0.0000E+00
19th surface K = 3.7194
A2 = 0.0000E+00, A4 = 7.5159E−03, A6 = 5.3685E−04,
A8 = 1.7630E−04, A10 = 2.6154E−05
23rd surface K = −4.8434
A2 = 0.0000E+00, A4 = −3.4168E−03, A6 = 7.8407E−05,
A8 = 0.0000E+00, A10 = 0.0000E+00

Numerical data
Zoom ratio 4.57

|  | Wide angle | Intermediate | Telephoto |
|---|---|---|---|
| Focal length | 4.42584 | 9.46439 | 20.22743 |
| Fno. | 3.3867 | 4.5320 | 5.4128 |
| 2ω (°) | 72.68 | 32.89 | 15.56 |
| Image height | 2.9 | 2.9 | 2.9 |
| Lens total length | 32.9943 | 32.9919 | 33.0000 |
| BF | 0.79556 | 0.79556 | 0.79556 |
| d7 | 0.28461 | 2.77053 | 5.45705 |
| d11 | 5.30561 | 2.82303 | 0.12812 |
| d14 | 3.45787 | 1.56268 | 0.50000 |
| d19 | 3.30612 | 3.68320 | 3.27474 |
| d21 | 0.80942 | 2.32179 | 3.80942 |

Zoom lens group data

| Group | Initial surface | focal length |
|---|---|---|
| 1 | 1 | 9.58141 |
| 2 | 8 | −4.46578 |
| 3 | 12 | 20.00000 |
| 4 | 15 | 7.03196 |
| 5 | 20 | −5.12938 |
| 6 | 22 | 5.74259 |

Numerical Example 4 unit mm

Surface data

| Surface no. | r | d | nd | vd | ER |
|---|---|---|---|---|---|
| Object plane | ∞ | ∞ |  |  |  |
| 1 | ∞ | 0.00 |  |  | 4.447 |
| 2 | 87.1574 | 0.6000 | 1.82918 | 24.06 | 4.363 |
| 3* | 8.7187 | 1.2750 |  |  | 3.818 |
| 4 | ∞ | 6.1000 | 1.91048 | 31.32 | 3.721 |
| 5 | ∞ | 0.2000 |  |  | 2.858 |
| 6* | 8.1672 | 1.7719 | 1.59412 | 67.02 | 2.677 |
| 7 | −9.4161 | Variable |  |  | 2.700 |
| 8* | −7.8115 | 0.6000 | 1.68082 | 55.34 | 2.200 |
| 9* | 2.6513 | 0.2807 |  |  | 1.984 |
| 10* | 3.4523 | 0.9209 | 1.63895 | 23.27 | 2.028 |
| 11* | 9.7438 | Variable |  |  | 1.943 |
| 12* | 10.6592 | 0.6415 | 1.53296 | 55.69 | 1.760 |
| 13 | ∞ | 0.2000 |  |  | 1.721 |
| 14 (stop) | ∞ | Variable |  |  | 1.700 |
| 15* | 2.9479 | 2.0144 | 1.53296 | 55.69 | 2.100 |
| 16* | −17.6503 | 0.0500 |  |  | 1.937 |
| 17 | 15.3556 | 0.8748 | 1.49846 | 81.54 | 1.838 |
| 18 | −8.1724 | 0.5000 | 1.82918 | 24.06 | 1.683 |
| 19* | 7.3367 | Variable |  |  | 1.526 |
| 20 | −4.0377 | 0.5000 | 1.83945 | 42.71 | 1.780 |
| 21 | −33.8712 | Variable |  |  | 2.010 |
| 22 | −363.2748 | 1.8703 | 1.53296 | 55.69 | 2.421 |
| 23* | −3.2499 | 0. |  |  | 2.705 |
| 24 | ∞ | 0.2000 |  |  | 2.831 |
| 25 | ∞ | 0.3000 | 1.51825 | 64.14 | 2.858 |
| 26 | ∞ | 0.8000 |  |  | 2.885 |
| Image plane | ∞ |  |  |  |  |

Aspherical surface data

3rd surface

K = −0.8436
A2 = 0.0000E+00, A4 = 4.9876E−04, A6 = −6.8388E−06,
A8 = 0.0000E+00, A10 = 0.0000E+00
6th surface K = −1.0399
A2 = 0.0000E+00, A4 = 2.7188E−04, A6 = −5.6584E−06,
A8 = 0.0000E+00, A10 = 0.0000E+00
7th surface K = −1.0078
A2 = 0.0000E+00, A4 = 4.6631E−04, A6 = −6.3127E−06,
A8 = 0.0000E+00, A10 = 0.0000E+00
8th surface K = 5.0000
A2 = 0.0000E+00, A4 = −1.8561E−03, A6 = 4.5206E−04,
A8 = 0.0000E+00, A10 = 0.0000E+00
9th surface K = −2.2813
A2 = 0.0000E+00, A4 = 4.2704E−03, A6 = −6.6223E−04,
A8 = 0.0000E+00, A10 = 0.0000E+00
10th surface K = −4.0597
A2 = 0.0000E+00, A4 = 9.8160E−03, A6 = −2.4322E−04,
A8 = 0.0000E+00, A10 = 0.0000E+00
11th surface K = −2.5434
A2 = 0.0000E+00, A4 = −2.4515E−04, A6 = 1.0771E−03,
A8 = 0.0000E+00, A10 = 0.0000E+00

-continued unit mm

12th surface

K = 3.7311
A2 = 0.0000E+00, A4 = −7.4039E−04, A6 = −1.2066E−05,
A8 = 0.0000E+00, A10 = 0.0000E+00

15th surface

K = −0.6847
A2 = 0.0000E+00, A4 = 2.2304E−03, A6 = 1.4534E−04,
A8 = 0.0000E+00, A10 = 0.0000E+00

16th surface

K = 1.6474
A2 = 0.0000E+00, A4 = −2.0384E−03, A6 = 1.1739E−04,
A8 = 0.0000E+00, A10 = 0.0000E+00

19th surface

K = 4.6611
A2 = 0.0000E+00, A4 = 1.0319E−02, A6 = 1.0557E−03,
A8 = 7.9981E−05, A10 = 1.0618E−04

23rd surface

K = −4.3505
A2 = 0.0000E+00, A4 = −2.4066E−03, A6 = 4.4175E−05,
A8 = 0.0000E+00, A10 = 0.0000E+00

Numerical data
Zoom ratio 4.57

| | Wide angle | Intermediate | Telephoto |
|---|---|---|---|
| Focal length | 4.42436 | 9.46005 | 20.20005 |
| Fno. | 3.3781 | 4.5537 | 5.4014 |
| 2ω (°) | 72.85 | 33.03 | 15.59 |
| Image height | 2.9 | 2.9 | 2.9 |
| Lens total length | 32.9944 | 32.9900 | 33.0000 |
| BF | 0.79480 | 0.79480 | 0.79480 |
| d7 | 0.26805 | 2.74497 | 5.43426 |
| d11 | 5.30251 | 2.83158 | 0.12963 |
| d14 | 3.56505 | 1.60785 | 0.50000 |
| d19 | 3.33728 | 3.73709 | 3.41463 |
| d21 | 0.82216 | 2.36919 | 3.82216 |

Zoom lens group data

| Group | Initial surface | focal length |
|---|---|---|
| 1 | 1 | 9.70196 |
| 2 | 8 | −4.50115 |
| 3 | 12 | 20.00000 |
| 4 | 15 | 7.16853 |
| 5 | 20 | −5.50304 |
| 6 | 22 | 6.14171 |

Numerical Example 5 unit mm

Surface data

| Surface no. | r | d | nd | vd | ER |
|---|---|---|---|---|---|
| Object plane | ∞ | 0.00 | | | 4.297 |
| 1 | 41.664 | 0.60 | 1.92286 | 20.88 | 4.157 |
| 2 | 7.413 | 1.27 | | | 3.663 |
| 3 | ∞ | 6.40 | 1.84666 | 23.78 | 3.605 |
| 4 | ∞ | 0.20 | | | 2.962 |
| 5* | 12.637 | 1.43 | 1.74320 | 49.34 | 2.865 |
| 6* | −13.524 | Variable | | | 2.700 |
| 7 | −12.553 | 0.50 | 1.80610 | 40.92 | 2.597 |
| 8 | 4.330 | 1.22 | 1.92286 | 20.88 | 2.387 |
| 9 | 10.011 | D10 | | | 2.256 |
| 10* | 13.324 | 0.66 | 1.53071 | 55.69 | 1.754 |
| 11 | ∞ | 0.30 | | | 1.698 |
| 12 (stop) | ∞ | Variable | | | 1.650 |
| 13* | 3.184 | 2.21 | 1.49700 | 81.54 | 2.200 |
| 14 | −8.821 | 1.11 | | | 2.110 |
| 15 | −60.233 | 1.20 | 1.82114 | 24.06 | 1.773 |
| 16* | 5.286 | Variable | | | 1.586 |
| 17* | −8.894 | 0.50 | 1.63493 | 23.90 | 1.800 |
| 18 | 57.579 | Variable | | | 1.980 |
| 19 | 101.128 | 1.39 | 1.53071 | 55.69 | 3.000 |
| 20* | −8.781 | 0.00 | | | 2.899 |
| 21 | ∞ | 0.20 | | | 3.001 |
| 22 | ∞ | 0.30 | 1.51633 | 64.14 | 3.042 |
| 23 | ∞ | 1.00 | | | 3.082 |
| Image plane | ∞ | | | | |

Aspherical surface data

5rd surface

K = −4.180
A4 = 1.58693e−05, A6 = −2.87220e−06

6th surface

K = 2.352
A4 = −4.44588e−05, A6 = 2.77528e−06

10th surface

K = −1.704
A4 = 4.09756e−04, A6 = −3.71664e−05

13th surface

K = −0.999
A4 = 1.14581e−03, A6 = −2.99752e−05

16th surface

K = 5.000
A4 = 5.04987e−03, A6 = 2.17645e−04

17th surface

K = −1.066
A4 = −1.11979e−04, A6 = −4.55313e−04

20th surface

K = −5.000
A4 = −1.69785e−04, A6 = −8.87397e−05

Numerical data

| | Wide angle | Intermediate | Telephoto |
|---|---|---|---|
| Focal length | 5.11 | 8.30 | 13.45 |
| Fno. | 3.42 | 4.04 | 4.78 |
| 2ω (°) | 66.48 | 40.42 | 25.47 |
| d6 | 0.20 | 2.86 | 5.31 |
| d9 | 5.34 | 2.68 | 0.23 |
| d12 | 3.56 | 2.31 | 1.00 |
| d16 | 1.41 | 1.31 | 1.19 |
| d18 | 1.50 | 2.85 | 4.27 |
| fb (in air) | 1.40 | 1.40 | 1.40 |
| Lens total length (in air) | 32.40 | 32.40 | 32.40 |

Group focal length f1 = 14.43  f2 = −7.53  f3 = 25.00  f4 = 7.90  f5 = −11.98  f6 = 15.23

Numerical Example 6 unit mm

Surface data

| Surface no. | r | d | nd | vd | ER |
|---|---|---|---|---|---|
| Object plane | ∞ | 0.00 | | | 3.765 |
| 1 | 52.694 | 0.60 | 1.92286 | 18.90 | 3.682 |
| 2 | 6.915 | 1.17 | | | 3.256 |
| 3 | ∞ | 5.85 | 1.84666 | 23.78 | 3.200 |
| 4 | ∞ | 0.20 | | | 2.708 |
| 5* | 14.073 | 1.33 | 1.80610 | 40.88 | 2.638 |
| 6 | −11.955 | Variable | | | 2.500 |
| 7 | −11.319 | 0.50 | 1.80400 | 46.57 | 2.318 |
| 8 | 3.862 | 1.18 | 2.00069 | 25.46 | 2.162 |
| 9 | 8.427 | Variable | | | 2.036 |
| 10* | 13.324 | 0.70 | 1.53071 | 55.69 | 1.640 |
| 11 | ∞ | 0.30 | | | 1.586 |
| 12 (stop) | ∞ | Variable | | | 1.550 |
| 13* | 3.895 | 2.50 | 1.49700 | 81.54 | 2.200 |
| 14* | −5.465 | 0.64 | | | 2.193 |
| 15 | 6.892 | 0.65 | 1.84666 | 23.78 | 1.936 |
| 16 | 2.979 | Variable | | | 1.717 |
| 17* | −40.337 | 0.50 | 1.63493 | 23.90 | 2.021 |
| 18 | 10.575 | Variable | | | 2.119 |
| 19 | 66.282 | 1.15 | 1.53071 | 55.69 | 2.856 |
| 20* | −11.014 | 0.00 | | | 3.005 |
| 21 | ∞ | 0.20 | | | 3.067 |
| 22 | ∞ | 0.30 | 1.51633 | 64.14 | 3.099 |
| 23 | ∞ | 1.00 | | | 3.130 |
| Image plane | ∞ | | | | |

Aspherical surface data

5rd surface

K = −2.337
A4 = −6.38701e−06, A6 = −7.24336e−07

10th surface

K = −3.700
A4 = 3.33816e−04, A6 = −7.60936e−05

13th surface

K = −3.111
A4 = 3.65602e−03, A6 = −2.56348e−04

14th surface

K = −5.465
A4 = 3.27883e−03, A6 = −2.12760e−04

17th surface

K = −4.592
A4 = 4.54185e−04, A6 = −3.05606e−04

20th surface

K = 3.174
A4 = 2.37957e−03, A6 = −2.24924e−04,
A8 = 4.36583e−06

Zoom data

| | Wide angle | Intermediate | Telephoto |
|---|---|---|---|
| Focal length | 5.41 | 8.73 | 14.06 |
| Fno. | 3.86 | 4.66 | 5.31 |
| 2ω (°) | 63.43 | 39.01 | 24.39 |
| d6 | 0.42 | 2.72 | 5.24 |
| d9 | 5.07 | 2.77 | 0.25 |
| d12 | 3.69 | 2.19 | 1.10 |
| d16 | 2.71 | 2.45 | 2.59 |
| d18 | 2.15 | 3.91 | 4.85 |
| fb (in air) | 1.40 | 1.40 | 1.40 |
| Lens total length (in air) | 32.70 | 32.70 | 32.70 |

-continued unit mm

Group focal length f1 = 13.20  f2 = −7.06  f3 = 25.00  f4 = 8.29  f5 = −13.02  f6 = 17.81

Numerical Example 7 unit mm

Surface data

| Surface no. | r | d | nd | vd | ER |
|---|---|---|---|---|---|
| Object plane | ∞ | 0.00 | | | 3.761 |
| 1 | 52.464 | 0.60 | 1.92286 | 18.90 | 3.679 |
| 2 | 6.963 | 1.16 | | | 3.255 |
| 3 | ∞ | 5.80 | 1.90366 | 31.32 | 3.198 |
| 4 | ∞ | 0.20 | | | 2.712 |
| 5* | 14.009 | 1.33 | 1.80610 | 40.88 | 2.640 |
| 6 | −11.676 | Variable | | | 2.500 |
| 7 | −11.365 | 0.50 | 1.80400 | 46.57 | 2.399 |
| 8 | 3.800 | 1.22 | 2.00069 | 25.46 | 2.208 |
| 9 | 8.246 | Variable | | | 2.064 |
| 10* | 13.632 | 0.70 | 1.53071 | 55.69 | 1.601 |
| 11 | ∞ | 0.30 | | | 1.544 |
| 12 (stop) | ∞ | Variable | | | 1.500 |
| 13* | 3.694 | 2.46 | 1.49700 | 81.54 | 1.950 |
| 14* | −5.439 | 0.61 | | | 1.946 |
| 15 | 7.266 | 0.59 | 1.84666 | 23.78 | 1.759 |
| 16 | 2.883 | Variable | | | 1.586 |
| 17* | 71.001 | 0.50 | 1.63493 | 23.90 | 2.007 |
| 18 | 8.645 | Variable | | | 2.089 |
| 19 | 68.228 | 1.44 | 1.53071 | 55.69 | 2.850 |
| 20* | −8.580 | 0.00 | | | 3.045 |
| 21 | ∞ | | | | 3.109 |
| 22 | ∞ | 0.30 | 1.51633 | 64.14 | 3.135 |
| 23 | ∞ | 1.00 | | | 3.160 |
| Image plane | ∞ | | | | |

Aspherical surface data

5rd surface

K = −1.998
A4 = −2.46085e−05, A6 = −2.43554e−06  A8 = 1.29389e−07

10th surface

K = −3.353
A4 = 3.19870e−04, A6 = −3.62401e−05  A8 = −7.85893e−06

13th surface

K = −2.973
A4 = 4.22443e−03, A6 = −3.25391e−04  A8 = 6.69658e−06

14th surface

K = −0.544
A4 = 3.51833e−03, A6 = −3.11317e−04  A8 = 9.70539e−06

17th surface

K = −5.000
A4 = 7.98870e−04, A6 = −3.78001e−04  A8 = 1.73210e−05

20th surface

K = −0.427
A4 = 3.10899e−03, A6 = −3.76833e−04  A8 = 1.03818e−05

Zoom data

| | Wide angle | Intermediate | Telephoto |
|---|---|---|---|
| Focal length | 5.41 | 8.71 | 14.07 |
| Fno. | 4.00 | 4.84 | 5.38 |
| 2ω (°) | 63.42 | 39.20 | 24.38 |

-continued unit mm

| | | | |
|---|---|---|---|
| d6 | 0.20 | 2.43 | 5.12 |
| d9 | 5.17 | 2.94 | 0.25 |
| d12 | 3.56 | 1.98 | 1.10 |
| d16 | 2.74 | 2.36 | 2.60 |
| d18 | 2.20 | 4.15 | 4.80 |
| fb (in air) | 1.40 | 1.40 | 1.40 |
| Lens total length (in air) | 32.70 | 32.70 | 32.70 |

Group focal length f1 = 12.96  f2 = −6.99  f3 = 25.58  f4 = 8.58  f5 = −15.40  f6 = 14.39

Values of conditional expressions in each of examples are shown below:

| | Example 1 | Example 2 | Example 3 | Example 4 |
|---|---|---|---|---|
| Expressional conditions (1) | 1.00 | 1.00 | 1.01 | 1.03 |
| Expressional conditions (2) | 0.68 | 0.70 | 0.68 | 0.68 |
| Expressional conditions (3) | 3.14 | 2.95 | 2.34 | 2.24 |
| Expressional conditions (4) | 0.45 | 0.38 | 0.38 | 0.37 |
| Expressional conditions (5) | 4.23 | 3.82 | 4.52 | 4.52 |
| Expressional conditions (6) | 1.88 | 1.91 | 2.16 | 2.03 |
| Expressional conditions (7) | 43.0 | 43.0 | 43.0 | 43.0 |
| Expressional conditions (8) | 0.92 | 0.92 | 0.94 | 0.93 |

| | Example 5 | Example 6 | Example 7 |
|---|---|---|---|
| Expressional conditions (1) | 1.74 | 1.51 | 1.49 |
| Expressional conditions (2) | 0.54 | 0.50 | 0.48 |
| Expressional conditions (3) | 1.58 | 1.55 | 1.47 |
| Expressional conditions (4) | 0.76 | 0.72 | 0.77 |
| Expressional conditions (5) | 4.89 | 4.62 | 4.72 |
| Expressional conditions (6) | 2.05 | 2.04 | 2.00 |
| Expressional conditions (7) | 28.5 | 22.0 | 22.0 |
| Expressional conditions (8) | 0.96 | 0.97 | 0.98 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 9:
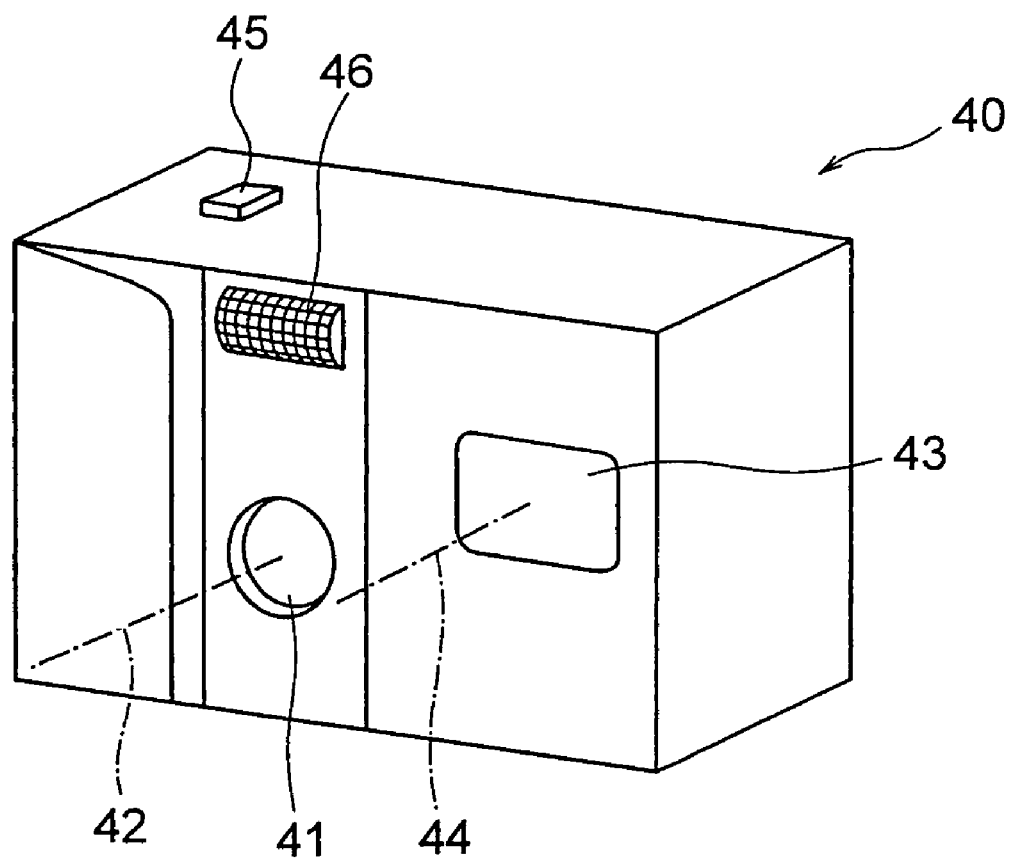
FIG. 9 is a front perspective view showing an appearance of a digital camera 40 in which, a zooming optical system according to the present invention is incorporated.
Figure 11:
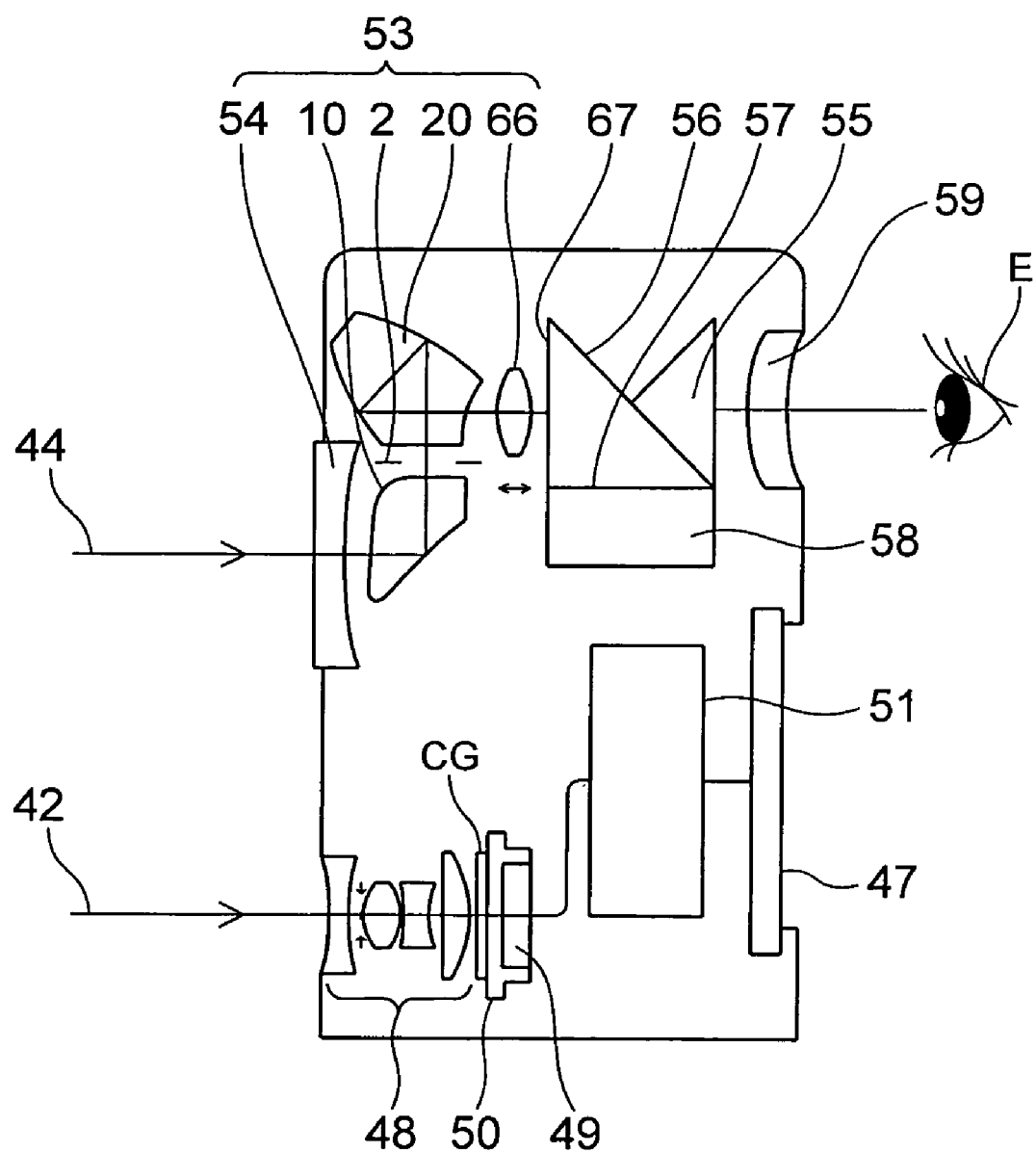
FIG. 11 is a cross-sectional view showing an optical arrangement of the digital camera 40.

In FIG. 9 to FIG. 11 show conceptual diagrams of structures in which the image forming optical system according to the present invention is incorporated in a photographic optical system 41 of a digital camera. FIG. 9 is a frontward perspective view showing an appearance of a digital camera 40, FIG. 10 is a rearward perspective view of the same, and FIG. 11 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 such as the zoom lens in the first embodiment. An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 12:
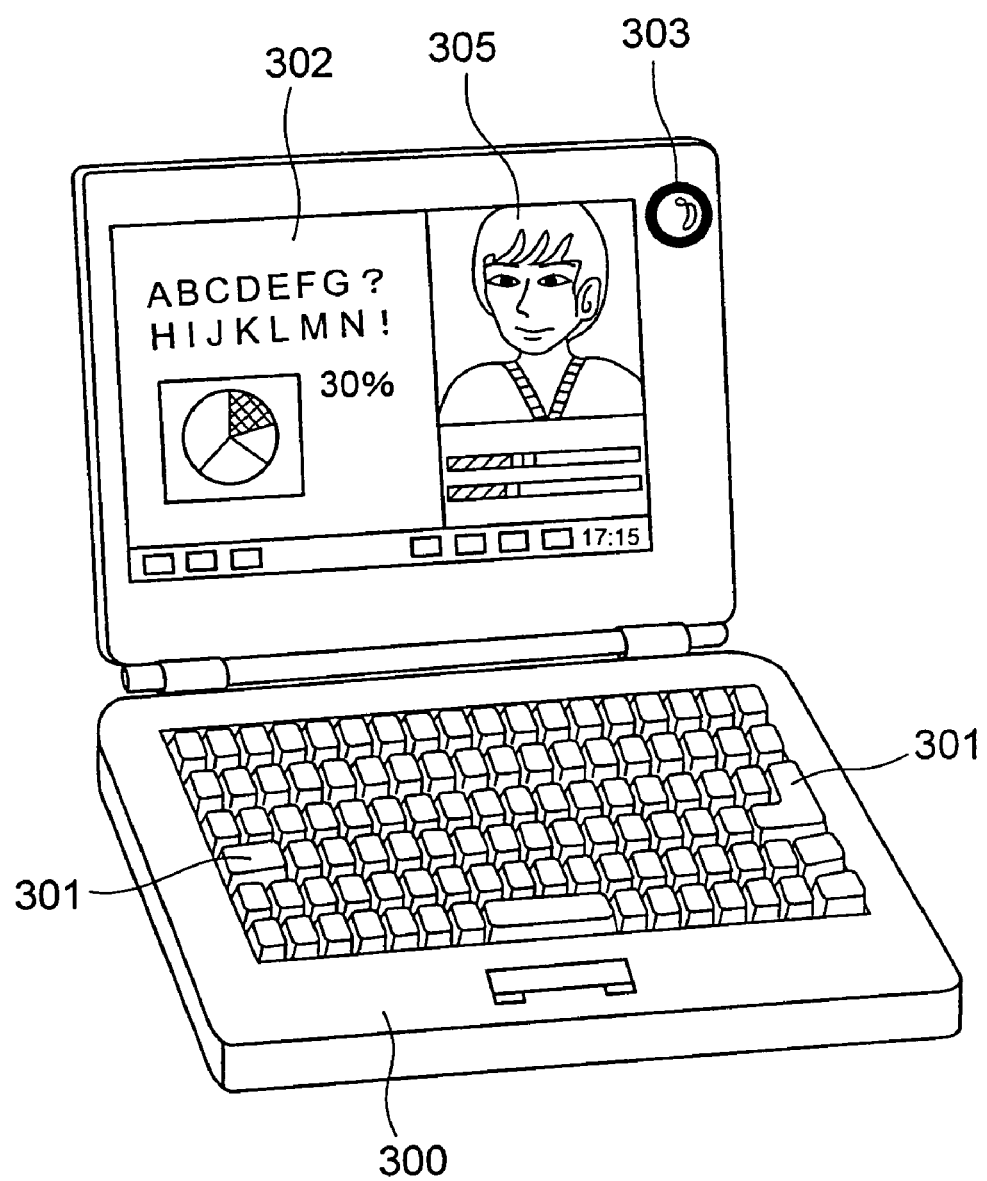
FIG. 12 is a front perspective view of a state in which, a cover of a personal computer 300 which is an example of an information processing unit in which, the zooming optical system of the present invention is built-in as an objective optical system, is opened.
Figure 13:
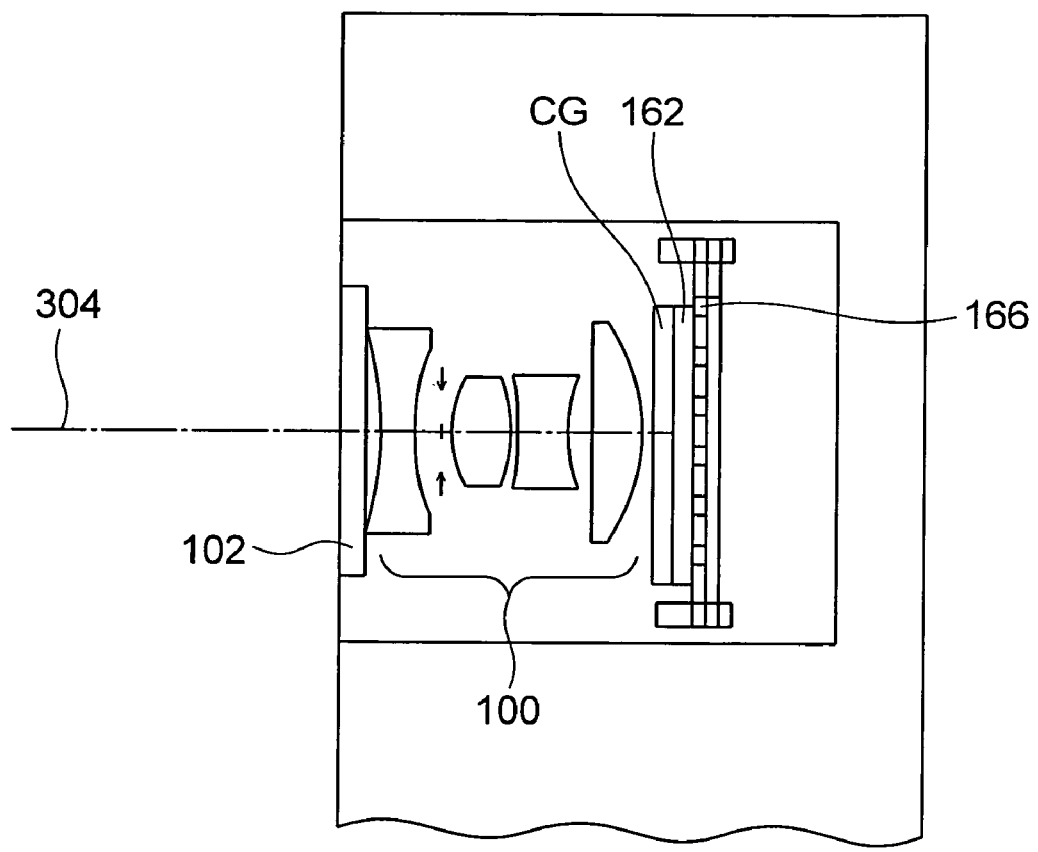
FIG. 13 is a cross-sectional view of a photographic optical system 303 of the personal computer 300.
Figure 14:
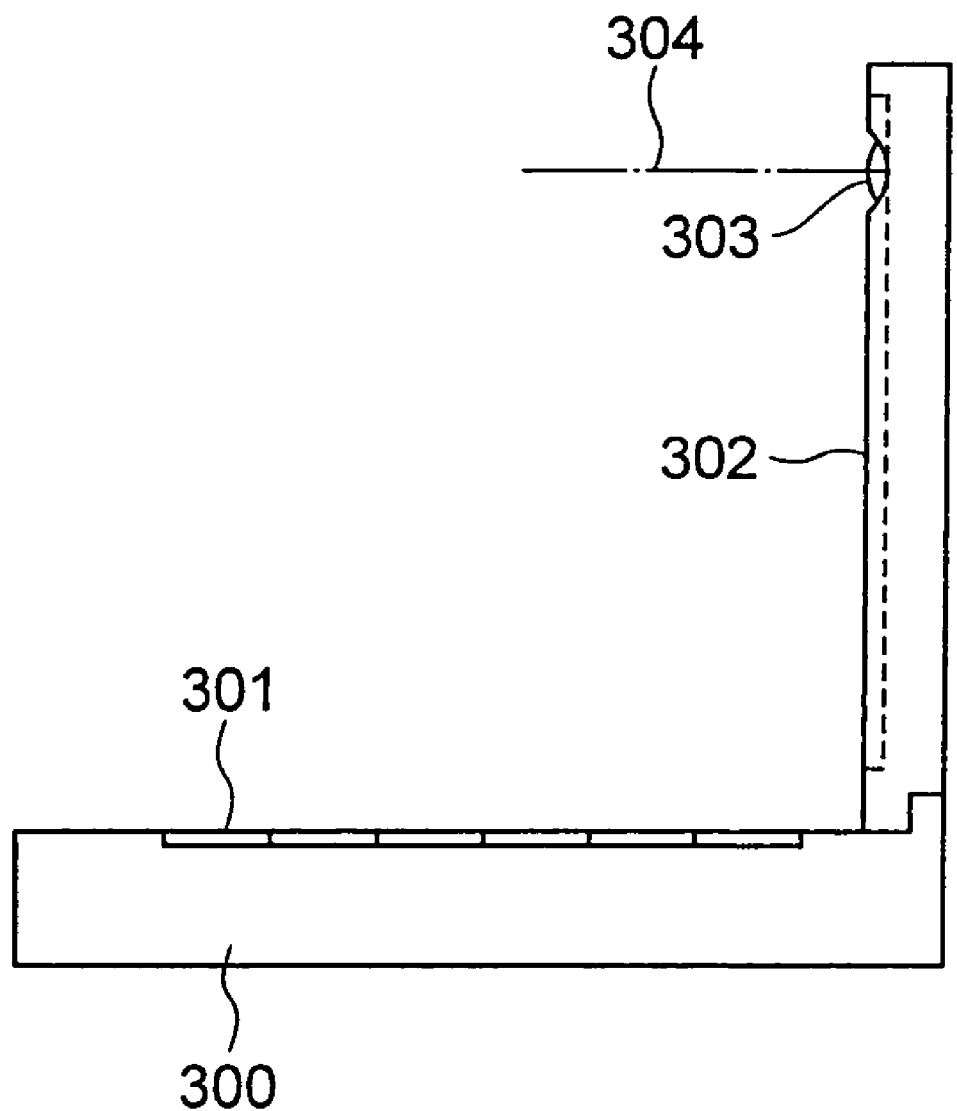
FIG. 14 is a side view of the personal computer 300.

Next, a personal computer which is an example of an information processing apparatus with a built-in image forming system as an objective optical system is shown in FIG. 12 to FIG. 14. FIG. 12 is a frontward perspective view of a personal computer 300 with its cover opened, FIG. 13 is a cross-sectional view of a photographic optical system 303 of the personal computer 300, and FIG. 14 is a side view of FIG. 12. As it is shown in FIG. 12 to FIG. 14, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 12, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 15A:
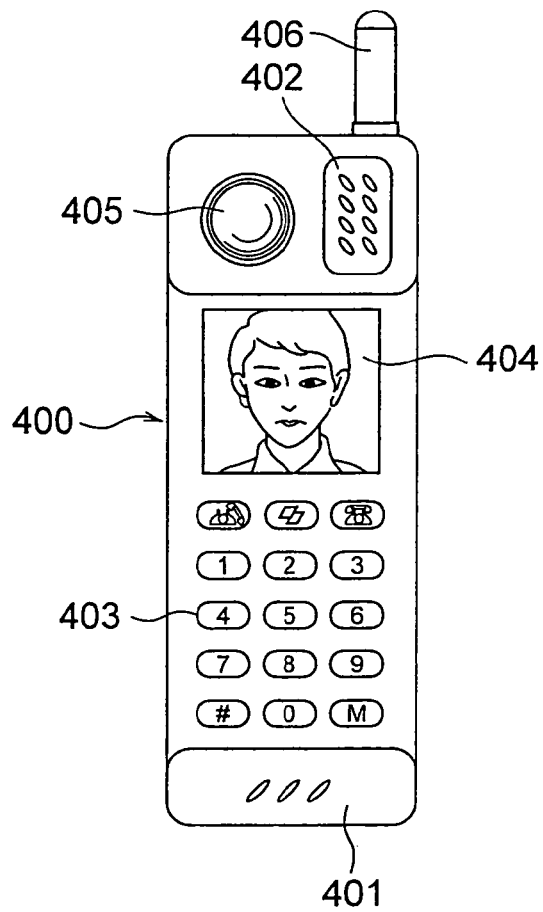
FIG. 15A, FIG. 15B, and FIG. 15c are diagrams showing a mobile telephone which is an example of an information processing apparatus in which, the zooming optical system of the present invention is incorporated as a photographic optical system, where.
Figure 15B:
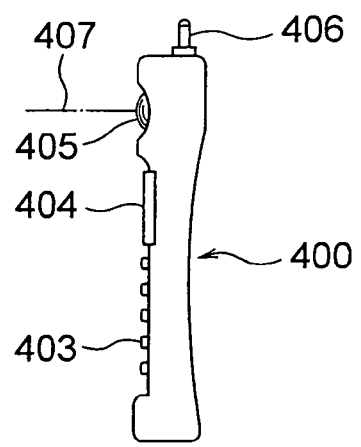
Figure 15C:
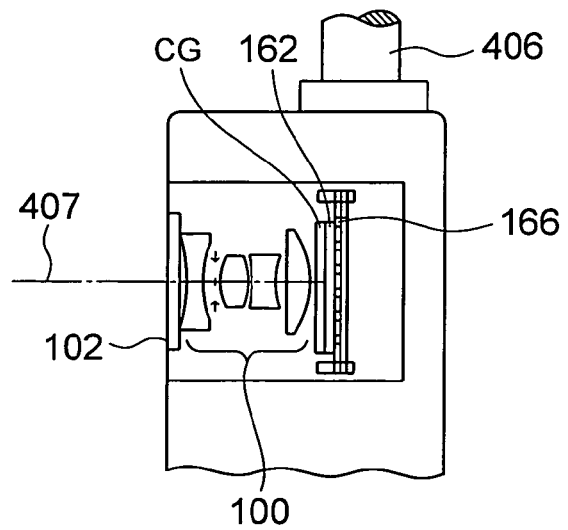

Next, a telephone which is an example of an information processing apparatus in which the image forming optical system of the present invention is built-in as a photographic optical system, particularly a portable telephone which is easy to carry is shown in FIG. 15A, FIG. 15B, and FIG. 15C. FIG. 15A is a front view of a portable telephone 400, FIG. 15B is a side view of the portable telephone 400, and FIG. 15C is a cross-sectional view of a photographic optical system 405. As shown in FIG. 15A to FIG. 15C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

According to the present invention, it is possible to provide a zooming optical system in which, the curvature of field and chromatic aberration are corrected favorably even when the total length is made short, and an electronic image pickup apparatus in which the zooming optical system is used.

What is claimed is:

1. A zooming optical system having six lens groups comprising in order from an object side:
   a first lens group having a positive refracting power, which is fixed at the time of zooming;
   a second lens group having a negative refracting power, which is movable at the time of zooming;
   a third lens group having a positive refracting power, which is fixed at the time of zooming;
   a fourth lens group having a positive refracting power, which is movable at the time of zooming;
   a fifth lens group having a negative refracting power, which is movable at the time of zooming; and
   a sixth lens group having a positive refracting power, which is fixed at the time of zooming, wherein
   the first lens group includes a reflecting optical element for folding an optical path, and
   the third lens group includes an aperture stop, and
   the fifth lens group includes a single lens, and
   the zooming optical system satisfies the following conditional expression $$0.5 \leq f1/\sqrt{(fw \cdot ft)} \leq 2.0$$

where,
   f1 denotes a focal length of the first lens group;
   fw denotes a focal length of the overall zooming optical system at a wide angle end, and
   ft denotes a focal length of the overall zooming optical system at a telephoto end.

2. The zooming optical system according to claim 1, wherein
   focusing is carried out by the fifth lens group, and
   the zooming optical system satisfies the following conditional expression $$0.4 \leq |\Delta 5g/fw| \leq 1.5$$

where,
   $\Delta 5g$ denotes an amount of movement of the fifth lens group from the wide angle end to the telephoto end, and
   fw denotes the focal length of the overall zooming optical system at the wide angle end.

3. The zooming optical system according to claim 1, wherein
   focusing is carried out by the fifth lens group, and
   the zooming optical system satisfies the following conditional expression $$1.1 < \beta 5gt < 5.0$$

where,
   $\beta 5gt$ denotes an image forming magnification of the fifth lens group when focused to any object point for which, image forming magnification of the overall zooming optical system at the telephoto end becomes not more than 0.01.

4. The zooming optical system according to claim 1, wherein the zooming optical system satisfies the following conditional expression $$0.20 \leq \mu 2g/\Delta 4g \cdot fw/ft \leq 0.90$$

where,
   $\Delta 2g$ denotes an amount of movement of the second lens group from the wide angle end to the telephoto end,
   $\Delta 4g$ denotes an amount of movement of the fourth lens group from the wide angle end to the telephoto end,
   fw denotes the focal length at the wide angle end of the overall zooming optical system, and
   ft denotes the focal length at the telephoto end of the overall zooming optical system.

5. The zooming optical system according to claim 1, wherein
   the third lens group includes only one positive lens, and
   the zooming optical system satisfies the following conditional expression $$2.0 \leq fg3/fw \leq 8.0$$

where,
   fg3 denotes a focal length of the third lens group, and
   fw denotes the focal length of at the wide angle end of the overall zooming optical system.

6. The zooming optical system according to claim 1, wherein the second lens group includes in order from the object side, only two lenses namely a negative lens and a positive lens.

7. The zooming optical system according to claim 1, wherein
a lens nearest to the object side in second lens group is a negative lens, and
the zooming optical system satisfies the following conditional expression $$1.0 \leq (R21-R22)/(R21+R22) \leq 4.3$$

where,
R21 denotes a radius of curvature of a surface on the object side of the negative lens, and
R22 denotes a radius of curvature of a surface on the image side of the negative lens.

8. The zooming optical system according to claim 1, wherein
the first lens group includes in order from the object side, a lens having a negative refracting power, a reflecting member, and a lens having a positive refracting power, and
the zooming optical system satisfies the following conditional expression $$20 \leq vd2-vd1 \leq 60$$

where,
vd1 denotes Abbe's number of the lens having a negative refracting power, and
vd2 denotes Abbe's number of the lens having a positive refracting power.

9. An electronic image pickup apparatus comprising:
a zooming optical system according to claim 1; and
an electronic image pickup element which is disposed on an image side of the zooming optical system, wherein
it is possible to process image data which has been obtained by picking up an image formed through the zooming optical system, by the electronic image pickup element, and to output as image data having a shape changed, and
the electronic image pickup apparatus satisfies the following condition expression, when the zooming optical system has focused to any object point for which, an image forming magnification of the overall zooming optical system at the telephoto end becomes not more than 0.01

$$0.70 \leq y08/(fw \cdot \tan \omega 08w) \leq 0.98$$

where,
y08 is expressed as y08=0.8·y10 when, in an effective image pickup surface (within a surface in which image can be picked up) of the electronic image pickup element, a distance (the maximum image height) from a center up to the farthest point is let to be y10,
ω08w denotes an angle with respect to an optical axis in an object point direction corresponding to an image point connecting to a position of y08 from a center on the image pickup surface at the wide angle end, and
fw denotes a focal length at the wide angle end of the overall zooming optical system.

* * * * *